United States Patent [19]

Okabe et al.

[11] Patent Number: 5,346,033
[45] Date of Patent: Sep. 13, 1994

[54] POWER TRANSMISSION APPARATUS FOR VEHICLE

[75] Inventors: Ichiro Okabe, Yamatotakada; Satoshi Kawai, Sakurai; Hideki Higashira, Ikoma; Hirakushi Suzou, Uda, all of Japan

[73] Assignee: Koyo Seiko Co., Ltd., Osaka, Japan

[21] Appl. No.: 823,203

[22] Filed: Jan. 21, 1992

[30] Foreign Application Priority Data

| Jan. 23, 1991 | [JP] | Japan | 3-024034 |
| Apr. 19, 1991 | [JP] | Japan | 3-116930 |
| Apr. 19, 1991 | [JP] | Japan | 3-116931 |
| Sep. 19, 1991 | [JP] | Japan | 3-268982 |

[51] Int. Cl.$^5$ .................................. B60K 17/35
[52] U.S. Cl. ................................ 180/248; 180/249
[58] Field of Search .............. 180/248, 249; 192/61, 192/103 F

[56] References Cited

U.S. PATENT DOCUMENTS

| 4,676,336 | 6/1987 | Hiramatsu et al. | |
| 4,727,966 | 3/1988 | Hiramatsu et al. | |
| 4,850,447 | 7/1989 | Hirakoshi et al. | |
| 4,980,521 | 12/1990 | Hiramatsu et al. | 192/103 F X |
| 5,074,825 | 12/1991 | Hamasaki et al. | 180/248 X |
| 5,154,252 | 10/1992 | Kawai et al. | 180/248 |

FOREIGN PATENT DOCUMENTS

| 0388876 | 9/1990 | European Pat. Off. | |
| 401774 | 12/1990 | European Pat. Off. | 180/249 |
| 415630 | 3/1991 | European Pat. Off. | 180/248 |
| 421594 | 4/1991 | European Pat. Off. | 180/248 |
| 450353 | 10/1991 | European Pat. Off. | 180/249 |
| 0460400 | 11/1991 | European Pat. Off. | |
| 153335 | 6/1989 | Japan | 180/249 |
| 167034 | 7/1991 | Japan | 180/248 |

OTHER PUBLICATIONS

Patent abstract of Japan (Japanese Patent application laid open No. 2-106438; Laid Open Date: Apr. 18, 1990; Date of Patent Jul. 25, 1989.

*Primary Examiner*—Andres Kashnikow
*Assistant Examiner*—Gary C. Hoge
*Attorney, Agent, or Firm*—Darby & Darby

[57] ABSTRACT

A power transmission apparatus for vehicle capable of obtaining a plurality of transmission characteristics by moving spools of variable throttle member 6 according to controlling current flowing to a driving coil 7 by steps, wherein a spool chamber 60 housing a first and second spools 61, 62 therein is communicated with discharge side of a vane pump 3 according to first and second communicating holes 54, 55. And by controlling current flowing to the driving coil 7 by steps, two kinds of magnetic fields, intense and weak are formed in the spool chamber 60. In the case where the first spool 61 moves to the position where it is contacted with the inside end of the spool chamber 60 by the action of the weak magnetic field, it closes an opening end of one communicating hole 54, and in the case where the second spool 62 moves to the position where it is contacted with the first spool 61, it opens an opening end of the other communicating hole 55. Three kinds of different transmission characteristics are obtained in the above mentioned cases and case of current cutoff, and the positions of the first and second spools 61, 62 do not vary in the respective cases. Thereby, positional variation caused at, spools are prevented and the respective transmission characteristics are stabilized.

14 Claims, 14 Drawing Sheets

POWER TRANSMISSION APPARATUS FOR VEHICLE

BACKGROUND OF THE INVENTION

1. Field of the Invention

The present invention relates to a power transmission apparatus for vehicles which transmits a driving force from one transmission shaft to the other transmission shaft by hydraulic pressure generated in a hydraulic pump, more particularly, it relates to a power transmission apparatus for vehicles which, in a four-wheel drive vehicle, transmits the driving force from the transmission shaft on the front wheel side to that on the rear wheel side or vice versa to realize a four-wheel driving state.

2. Description of the Related Art

In recent years, a four-wheel drive vehicle is particularly highlighted as the vehicle which can realize comfortable driving regardless of the road conditions, natural conditions such as weather and driving conditions, because of its high running stability in specific surface conditions such as the snow and ravel roads and its superb driving stability during the high speed driving and at acceleration and deceleration also on ordinary roads.

Furthermore, recently, a so-called full-time four-wheel drive vehicle constructed always to obtain substantially the four-wheel driving state by having a power transmission apparatus, which changes power distributions to the front and rear wheels responsive to the rotational speed difference generated therebetween when it took place, is a preferred product.

As such a four-wheel drive vehicle, it is the general trend to provide the power transmission apparatus which distributes the driving force responsive to the rotational speed difference between the front and rear wheels in the mid-part of a transmission shaft between the front and rear wheels. As such a power transmission apparatus, there is one which utilizes hydraulic pressure generated in a hydraulic pump particularly a vane pump which can be easily made to be small in size, light in weight and having good durability.

The vane pump, as already, known is provided with a casing with an annular cam ring having deviation in thickness and side plates mounted on its sides and a short cylindrical rotor onto which a plurality of plate vanes are disposed substantially in equal intervals in a circumferential direction mounted movable in a radial direction. This vane pump is constructed to form a pump chamber surrounded by the outer surface of the rotor, the inner surface of the cam ring, and further, by these and side walls of the side plates, by containing the rotor rotatably coaxially in an inner space of the casing. By sealing working oil introduced into the pump chamber between the vanes adjoining each other, pressure is raised responsive to the rotation of the rotor.

The power transmission apparatus is so designed that, by fixing the rotor coaxially to the driving shaft connected to either of the front and rear wheels, and fixing the casing coaxially to the driving shaft connected to the other wheels, relative rotation corresponding to the rotational speed difference between the front and rear wheels is generated between the rotor and the casing. At this time, since the hydraulic pressure generated iii the vane pump chamber corresponding to the relative rotation or the rotational speed difference between the front and rear wheels acts to restrain the relative rotation between the rotor and the casing. The driving force responsive to the rotational speed difference between the front and rear wheels is transmitted from one of the front and rear wheels to the other via the hydraulic pressure, thereby producing a desired four-wheel driving state.

In a four-wheel drive vehicle, for example, in case of driving on bad roads such as the snow and gravel roads, it is desirable to obtain a rigid coupling state as much as possible to achieve stable running. Meanwhile, in case of driving on the paved road, it is desirable to obtain a relatively loose coupling state to change transfer characteristics of the driving force between the front and rear wheels so as to reliably prevent a tight corner braking phenomenon. Besides, it is also desirable to change the transfer characteristics not only responsive to the road conditions aforementioned, but also to various running states such as the vehicle speed, steering angle and braking.

In the aforesaid power transmission apparatus which makes hydraulic pressure of a hydraulic pump as a transmission medium of driving force, it is possible to change a transmission characteristic according to changing a pressure characteristic which is dependent upon the magnitude of oil-through resistance an the discharge side of the hydraulic pump. To accomplish this, a power transmission apparatus has been proposed, which is so configurated as to satisfy the demand for changing a transmission characteristic into one responsive to a driving state of a vehicle by arranging a variable throttle member driven by a solenoid at a mid portion of the discharge side oil passage and controlling current flowing to the driving coil of a solenoid on the basis of the detected results of a various kinds of state quantities related to the driving state of a vehicle, such as steering angle, vehicle speed and number of rotations of an engine and to successively adjust a throttle opening of the amiable throttle member.

But since such a configuration demands an appropriate throttle opening corresponding to the respective detected results of a plurality of state quantities and a control unit of a complicated configuration which successively controls current flowing to the driving coil on the basis of the results, and results in bringing about a high product cost. Also, at the same time, a possibility exists that an unexpected accident originated in malfunction may happen due to a high possibility of defective operation because of electrical disturbances.

The applicants of the present invention have proposed a power transmission apparatus for vehicles in Japanese Patent application No. 2149650 (1990) in order to solve such difficulties. In the following, an explanation will be given on the power transmission apparatus disclosed iii this Japanese Patent Application No. 2149650 (1990) as a conventional example.

FIG. 1 is a longitudinal sectional view showing essential parts of the conventional power transmission apparatus for vehicle.

As shown in FIG. 1, in this conventional power transmission apparatus, between a vane pump 3 generating hydraulic pressure responsive to a rotational speed difference between front and rear wheels, and an output shaft 2 coupling with one of front and rear wheels a holding cylinder 50 is interposed coaxially and coupled thereto through respective coupling flanges 51, 52. And at the inside of a spool chamber 60 formed at a shaft center portion of the holding cylinder 50, a spool 6 is inserted movably along the shaft. The spool 6 is energized by two coil springs 60a, 60b of different length in the same direction and the spool 6 moves responsive to a driving coil 7 being circumferentially arranged at the outside of the holding cylinder 50, to configure a variable throttle member, opening/closing an opening end of a communicating hole 56 communicating with the discharge side of the vane pump 3 through an oil guiding hole 42 and an annular groove 37.

Current flowing to the driving coil 7 is changed in two steps, to produce two kinds of magnetic fields of different strength at the inside of the spool chamber. At the cutoff time of current, the spool 6 is at the position shown in the figure (opening position) pressed against a snap ring 60c attached to the spool chamber 60 by energizing force of a long coil spring 60a. And at a time of forming a weak magnetic field, the spool 6 moves by a distance S shown in FIG. 1 against the spring force of the coil spring 60a and stops at a position (middle position) where it contacts with another coil spring 60b. At a time of a more intense magnetic field the spool 6 moves against the spring force of both of the coil springs 60a, 60b and is restricted at a position (closing position) where it is pressed in the inside end of the spool chamber 60.

That is, according to aforementioned operation, the position of the spool 6 inside of the spool chamber 60 is variable in three ways. Since the opening area of the communicating hole 56, that is, oil through resistance at the discharge side of the vane pump 3, varies in three ways according to the movement of this spool 6, three kinds of transmission characteristics satisfactorily enough for practical use are realized. On the other hand, only two kinds of controlling is needed for adjusting the quantity of current flowing to the driving coil 7 in order to move the spool 6. Accordingly, configuration of the control unit for controlling the current control is simple, and one of the aforesaid difficulties is solved.

And, in the aforesaid Japanese Patent Application No. 2149650 (1990) a power transmission apparatus has been proposed, in which three kinds of transmission characteristics, by replacing the energizing of the spool 6 by two coil springs 60a, 60b, by the fact that the closing position, middle position and opening position are obtained respectively according to current flowing to both the coil springs 60a, 60b, current flowing only one coil spring 60a or 60b, and current cutoff to both of the coil springs 60a, 60b, thereby the aforesaid difficulties being solved by the proposal of this power transmission apparatus for vehicle.

In the conventional power transmission apparatus the spool 6 is positively restricted at the opening position where the spool 6 contacts with the inside end of the spool hole 60. However, at the middle position, the spool 6 is in a floating state supported by a balanced force between the spring force of the coil spring 60a, 60b and magnetic force generated by the driving coil 6. Accordingly, the position of the spool 6 tends to vary and there is a difficulty, that a transmission characteristic determined by the position of the spool 6.

Such a difficulty is more remarkable in the conventional configuration which adjusts the throttle opening of the variable throttle member by successively controlling current flowing to the solenoid. This produces a stabilized corresponding relation between the quantity of current flowing to the solenoid and the throttle opening is not obtained and transmission characteristics vary respectively at the respective throttle openings. As a result, there is the desirability of realizing a desired transmission characteristic corresponding to driving condition of a vehicle with high reliability.

SUMMARY OF THE INVENTION

The present invention has been devised in consideration of such circumstances, and the object thereof is to provide a power transmission apparatus for a vehicle capable of obtaining a plurality of different transmission characteristics each according to a simple configuration and of accurately realizing the respective characteristics because positional variations at the spool of the variable throttle member at the time of realizing the respective characteristics and there is little effect of positional error, thereby improving reliability and reducing product cost.

A power transmission apparatus for vehicle related to the invention includes a hydraulic pump having a rotor and casing which are interlockingly coupled respectively with the respective transmission shafts of the front and rear wheels of a vehicle and relatively rotate on the same shaft center. There is a coupling of the rotor with the casing according to hydraulic pressure generated responsive to a rotational speed difference between the rotor and the casing a variable throttle member is provided which is capable of interlockingly rotating with either of the rotor or the casing which has a spool chamber formed on the shaft center of the hydraulic pump and first and second communicating holes communicating respectively with the discharge side of the hydraulic pump open at respectively different positions along the shaft. A driving coil is circumferentially arranged at the spool chamber and forms internal of the chamber, two kinds of magnetic fields having different intensities. A first spool moves in the spool chamber to a predetermined restricting position by an action of a weak magnetic field formed by the driving coil and closes on opening either of the communicating holes; and a second spool moving in the spool chamber to a predetermined restricting position by an action of intense magnetic field produces by the driving coil and closes or opens the other communicating hole.

The power transmission apparatus for vehicle of the invention is so configured that the sectional areas of the first communicating hole is different from that of the second communicating hole.

Further, a power transmission apparatus for a vehicle according to the invention is so configured that a throttle member having an appropriate throttled area is fixed at the middle portion of one of, or both of the first and second communicating holes.

In the power transmission apparatus for vehicle of the invention the first spool moves in the case where a weak magnetic field is formed in the spool chamber according to current flowing to a driving coil, and the second spool moves in the case where an intense magnetic field is formed, respectively, and the opening ends of the first and second communicating holes at the discharge side of the hydraulic pump are closed or opened according to these movements. Accordingly, there exists the case where current flowing to the driving coil is cut off, the state where both of the communicating holes are closed, the state where one communicating hole is closed and the other is opened, and the state where both of them are opened, for example, are obtained respectively. According to difference between the oil through areas in these respective states, three kinds of different transmission characteristics are realized. At this time, since the first and second spools move to the predetermined positions where they are respectively restricted, thereby they do not stop at middle positions, and the transmission characteristics in respective states are kept stably.

And in a power transmission apparatus for vehicle of the invention, since the sectional areas of the first and second communicating holes are different from each other, the respective transmission characteristics are obtained by full-closing or full-opening the opening ends of the first and second communicating holes according to the movements of the first and second spools, thereby positioning the first and second spools with high accuracy becomes unnecessary.

Further, in a power transmission apparatus of the invention, since a throttle member having an appropriate throttle area is fixed at one of or both of the first and second communicating holes, oil-through resistance responsive to the throttle opening of the throttle member is obtained surely regardless of opening degrees when the respective communicating holes are opened according to the movements of the first and second spools. There is no need of positioning the first and second spool with high accuracy, thereby the degree of characteristic change originated in positioning error becomes small.

The above and further objects and features of the invention will more fully be apparent from the following detailed description with accompanying drawings.

DESCRIPTION OF THE PREFERRED EMBODIMENTS

In the following, the present invention will be described with reference to the drawings showing its preferred embodiments.

In some instances, reference will be made to FIGS. 4, 7, 10, 11, 13, or 14. The reader will appreciate that, in fact, such a reference will be collectively to the two figures bearing the same numerical designation. For example, a reference to FIG. 4 will be understood as a reference collectively to FIGS. 4(a) and 4(b).

Figure 1:
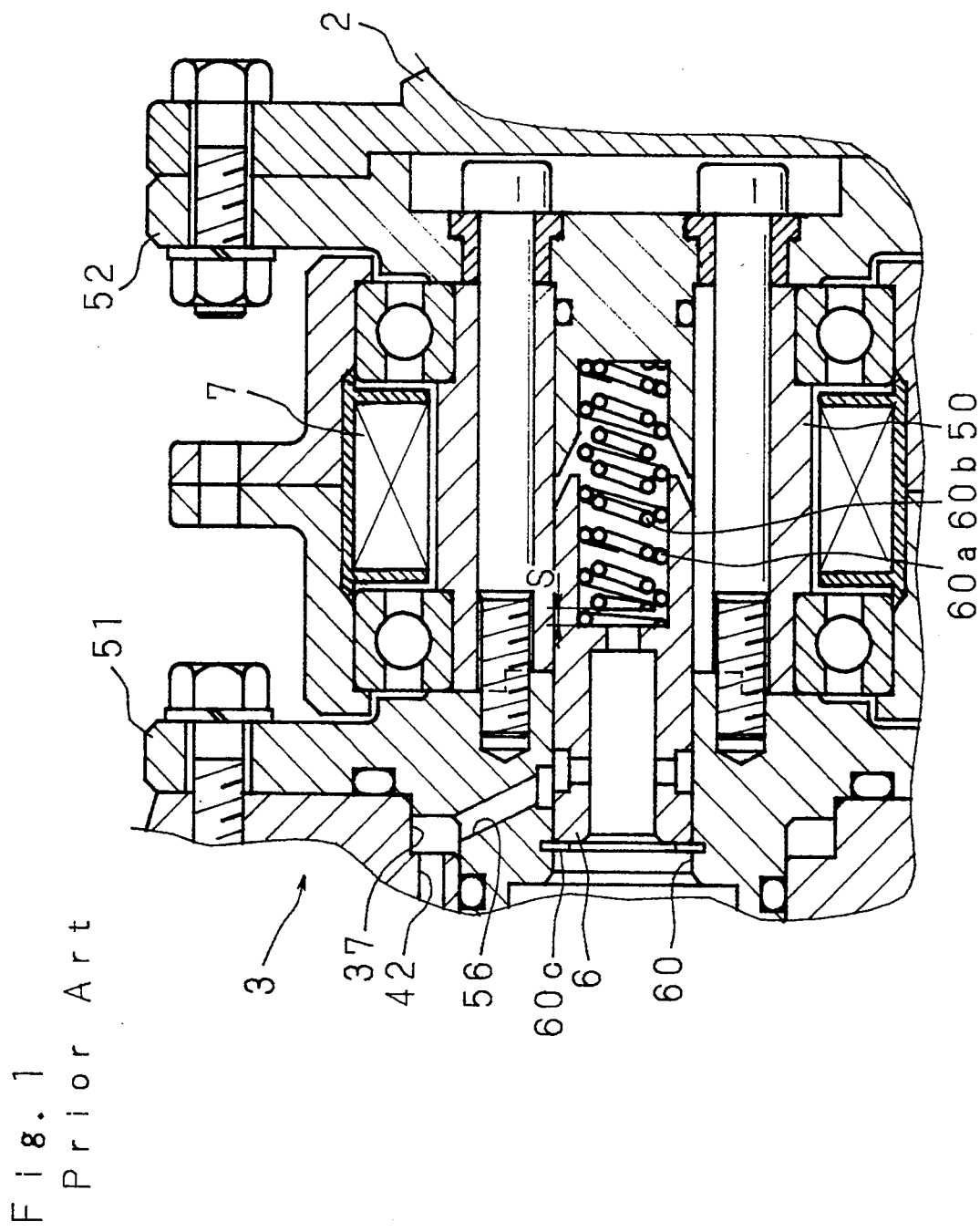
FIG. 1 is an enlarged sectional view showing a configuration of essential part of a conventional power transmission apparatus for vehicles.
Figure 2:
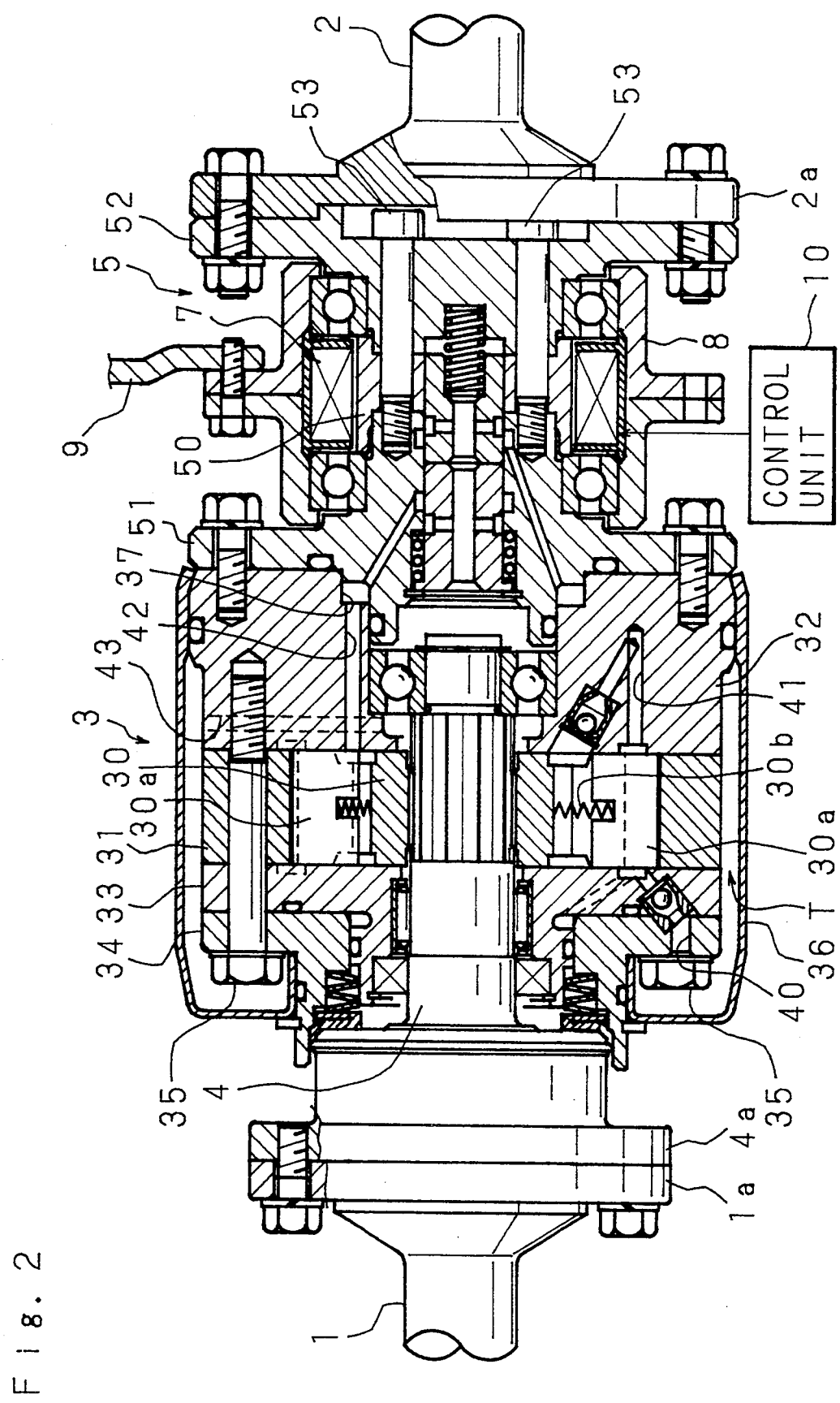
FIG. 2 is a longitudinal sectional view showing a whole configuration of a power transmission apparatus for vehicle of the invention.

FIG. 2 is a longitudinal sectional view showing a first embodiment of the invention of a vehicle power transmission apparatus (hereinafter referred to as an apparatus of the invention) according to the present invention.

In FIG. 2, numeral 1 designates an input shaft which rotates interlocking with either of front and rear wheels which receives transmission of a driving force directly from an engine as a power source, and numeral 2 designates an output shaft which rotates interlocking with the other front or rear wheels.

In the apparatus of the invention, by pressure generated in a vane pump 3 interposed between the input shaft I and the output shaft 2, the driving force is transmitted from the input shaft I to the output shaft 2, or from either of the front and rear wheels to the other wheels, corresponding to the rotational speed difference between the shafts or the rotational speed difference generated between the front and rear wheels.

Main component elements of the vane pump 3 comprises mainly a short cylindrical rotor 30, and a casing formed by a cam ring 31 coaxially the rotor 30 coaxially, a side plate 33 and a pressure plate 32 fixed to both sides of the cam ring 31 in a manner to be described later.

The rotor 30 has a plurality of strip-like receiving grooves formed substantially over equal intervals in its circumferential direction. Into the respective receiving grooves thin rectangular plate vanes 30a are inserted slidably in the radial direction of the rotor 30.

The cam ring 31 is a member formed cylindrically with deviation in thickness and having substantially the same axial length as the rotor 30. In the center thereof, a cavity is formed having a slightly larger diameter than the outside diameter of the rotor 30 and provided with a plurality of depressions arranged in equal intervals in a circumferential direction. The side plate 33 is a relatively thin annular disc shaped member and the pressure plate 32 is a relatively thick annular disc-shaped member, respectively, having a supporting hole of a rotor shaft 4 to be described later at their center position. The side plate 33 and the pressure plate 32 are mounted to the cam ring 31 by clamping the cam ring 31 therebetween. In the side plate 33, to one side of an annular disc position coaxially a short cylinder is mounted.

On the input shaft 1 side of the side plate 33, a keep plate 34 is disposed coaxially with the side plate 33, pressure and plate 32 rotor 30. The disc portion of the keep plate 34, side plate 33 and cam ring 31 are joined together with the keep plate 34 in a unit, by a plurality of fixing bolts 35 extending axially therethrough in this order on the other side of the side plate 33, and threaded into respective screw holes, not shown, formed in the pressure plate 33, to form the casing of the vane pump 3.

Outside the casing, a thin cylindrically formed cylindrical member 36 engaged partly to the periphery of the pressure plate 32 and to that of the cylindrical portion of the keep plate 34 is mounted. Working oil of the vane pump 3 is sealed inside an oil tank T formed annularly between the cylindrical member 36 and the casing.

In FIG. 2, numeral 5 designates a coupling member which serves as a spacer and is constituted by a cylindrical portion having a cavity of the shape to be described later in the center position thereof, and disc-shaped coupling flanges 51, 52 formed coaxially with the cylindrical portion on both sides thereof. The coupling member 5 is interposed between the casing of the vane pump 3 and the output shaft 2, one coupling flange 51 being secured to a coupling flange 51 formed at the end of the output shaft 2, and the other coupling flange 52 being fixed to the other side face of the pressure plate 32, thereby coupling the casing and the output shaft 2 on the same shaft.

Meanwhile, the rotor 30 is inserted in a space surrounded by the cavity of the cam ring 30, the side plate 33 and the pressure plate 32. The rotor 30 is provided on the rotor shaft 4 between the supports by spline engagement.

The rotor shaft 4 is supported by a needle roller bearing and a ball bearing respectively fixed inside the core portion of the side plate 33 and the pressure plate 32. The rotor shaft 4 is sealed at its periphery by an oil seal and an X-ring mounted on the inner wall of the cylindrical portion of the keep plate 34, and projecting on the side of the side plate 33 by suitable length. At the projecting end of the rotor shaft 4 a coupling flange 4a formed coaxially with the rotor shaft 4 is fixed to a disc flange 1a formed at the end of the input shaft 1, thereby coaxially coupling the rotor shaft 4 and the input shaft 1.

That is, the casing of the vane pump 3 is coupled to the output shaft 2 via the coupling member 5, and is rotated about its axis in interlocking motion with the rotation of the output shaft 2. Meanwhile since the rotor 30 is coupled to the input shaft 1 via the rotor shaft 4 and is rotated about its axis in interlocking motion the rotation of the input shaft 1, between the rotor 30 and the casing, the relative rotation corresponding to the rotational speed difference between the input shaft I and the output shaft 2, or between the front and rear wheels is generated.

In this way, between the outer surface of the rotor 30 and the inner wall of the cavity of the cam ring 31 inserted inside the casing, a space (pump chamber) surrounded by the surface and side walls of the side plate 33 and that of pressure plate 32 is formed at the position where depressions of the cam ring 31 are formed. In respective pump chambers, positioned at opposite ends in the rotating direction of the rotor 30, each pair of suction oil passages 40 opening on the side plate 33 side and each pair of discharge oil passages 41 opening on the pressure plate 32 side are formed.

Each of the suction oil passage 40 communicates with the oil from tank T penetrating through the keep plate 34 in a direction of its thickness via separate suction check valves 240 which are fixed to the disc portion of the side plate 33 responsive to the position of the suction oil passage 40 and allow only inflow of the working oil into the pump chamber.

On the other hand each of the discharge oil passage 41 communicates with the bottoms of the receiving grooves of respective vanes 30a, through separate discharge check valves, which are fixed at the middle thereof, formed in a manner to extend inward radially in the pressure plate 32, and allow only outflow of the working oil from the pump chamber.

Figure 3:
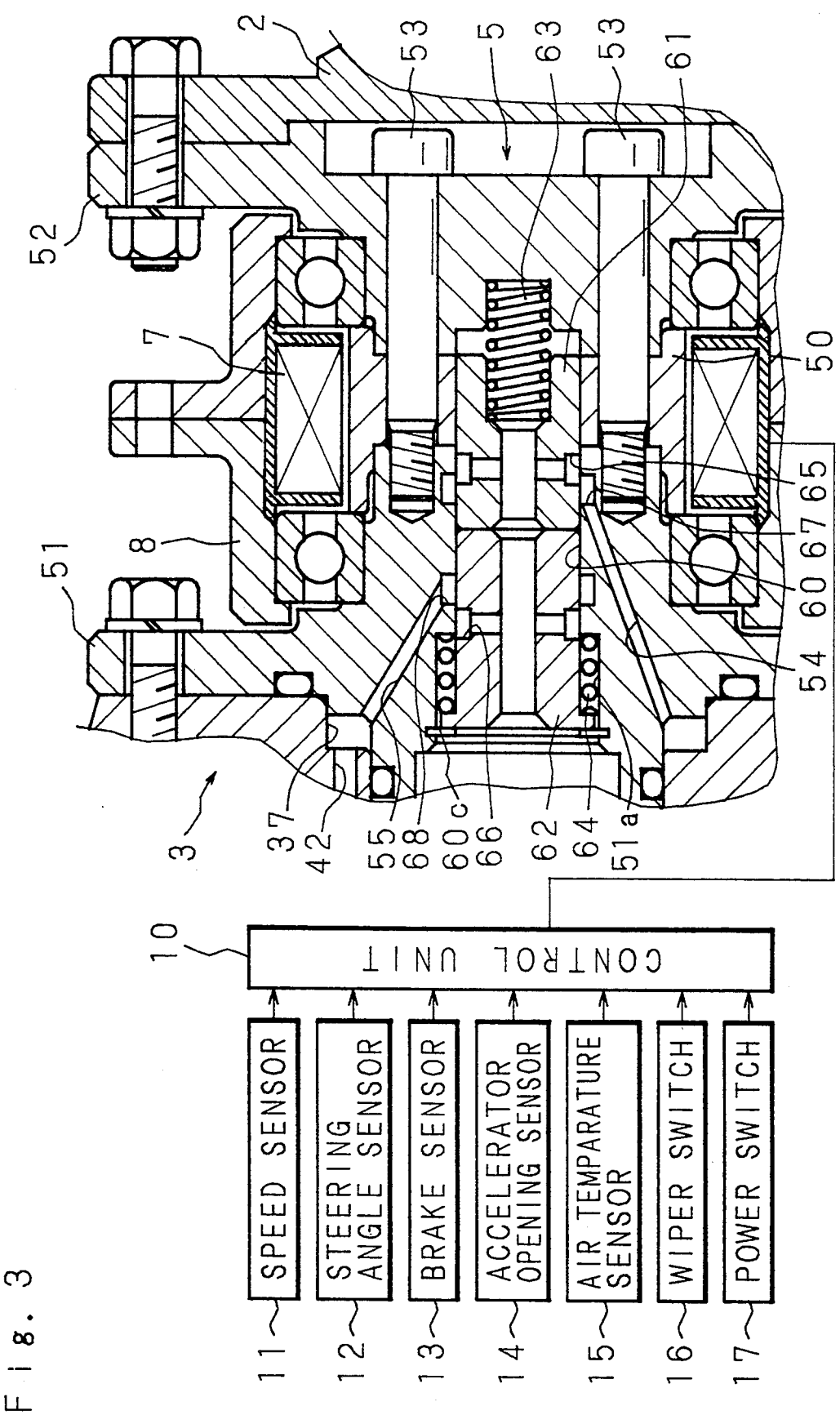
FIG. 3 is an enlarged sectional view showing a configuration of essential part of the first embodiment of a power transmission apparatus of the invention.

FIG. 3 is an enlarged sectional view of a portion of the first embodiment of the apparatus of the invention.

A coupling member 5 interposed between the vane pump 3 and the output shaft 2 and coupled them with each other and fixedly holds a non-magnetic holding cylinder 50 coaxially between the coupling flanges 51 and 52 for coupling respectively with the vane pump 3 and the output shaft 2. The holding cylinder 50 is held by a plurality of fixing bolts 53 which extend through the coupling flange 52 in the depth direction and further extend through the peripheral wall of the holding cylinder in the longitudinal direction to be screwed in the coupling flange 51. At the inside of the holding cylinder 50, through a circular hole 51a formed at the shaft center portion of the coupling flange 51 in the state of interfacing with the inner periphery of the holding cylinder is a spool. Chamber 60 which makes the end portion of the coupling flange 52 communicating with the cavity of the pressure plate 32 and fixed into the one side of the holding cylinder 50 as the inside end, is formed on the shaft center of the vane pump 3.

At the inside of the spool chamber 60, a first spool 61 and second spool 62, both of which are in the shape of cylinder and whose outer diameter is equal to the inner diameter of the spool chamber 60, are inserted and are movable along the axial direction. The first spool 61 at the inside is energized leftward in FIG. 3 by a coil spring 63 interposed between the inside end of the spool chamber 60 and the spool. The second spool 62 is energized leftward in FIG. 3, that is, toward the pressure plate 32 side, by a coil spring 64 interposed between a stepped portion in the middle of the spool chamber 60 and the spool. At the inner periphery in the vicinity of the opening end of the circular hole 51a, a snap ring 60c is attached, and the moving range of the second spool 62 is limited between the position at which the spool 62 contacts the snap ring 60c and the position at which the spool 62 contacts the end portion of the first spool 61. The moving area of the first spool 61 is limited between the position at which the spool 61 contacts the end portion of the spool 62 and the position at which the spool 61 contacts with the inside end of the spool chamber 60.

In addition, the coil spring 64 is selected so that enough spring constant is large enough compared with that of the coil spring 63.

At the outer peripheral surfaces of the first and second spools 61 and 62, throttle grooves 65, 66 are respective in formed in annular shape grooves 65, 66 communicate with the respective insides of the spools 61, 62 through respective communicating holes extending through the peripheral walls of the spools 61, 62 and at the inner peripheral surfaces of the spool chamber 60, a pair of throttle grooves 67, 68 of annular shape are formed separately from each other by a predetermined length along the axial direction. By fixing the coupling flange 51 to the pressure plate 32 the throttle grooves 67, 68 communicate with an annular groove 37 formed at the outer side surface of the pressure plate through first and second communicating passages 54, 55.

The inside cavities of the first and second spools 61, 62 communicate with the oil tank T through the cavity of the pressure plate 32 and reflux hole 43, and the annular groove 37, as aforementioned, communicates with the pump chamber of the vane pump 3 through the discharge oil passage 42 and oil guide hole 42. Thereby, the inside of the spool chamber 60 housing the first and second spools 61, 62 is in the state of communicating with the discharging side of the vane pump 3 through the first and second communicating holes 54, 55 respectively opening at two positions being separate from each other by in appropriate length in the longitudinal direction of the chamber.

The moving range of the first spool 61 in the spool chamber 61 includes the opening end of the first communicating hole 54, that is, the position at which one throttle groove 67 at the inner periphery of the coupling flange 51 is formed. And the moving range of the second spool 62 includes the opening end of the second communicating hole 55, that is, the position at which the other throttle groove 68 is formed. The opening end of the first communicating hole 54 is opened/closed by the movement of the first spool 61 and that of the second communicating hole 55 is by the movement of the second spool 62, respectively, oil-through resistance at the discharge side of the vane pump 3 being responsive to the opening and closing.

FIG. 4 is an explanatory view of operations of tile first and second spools 61, 62.

The throttle groove 67 being at the opening end of the first communicating hole 54 is in the opening state for the throttle groove 65, as shown in FIG. 3, in the case where the first spool 61 is pressed by spring force of tile coil spring 63 to he at the position where it is pressed to the end surface of the second spool 62. On the other hand the throttle groove 67 is in the almost completely closed state for the throttle groove 65, as shown in FIG. 4(a)(b) in the case where the first spool 61 moves against the spring force of the coil spring 63 to be contacted with the inside end of the spool chamber 60.

Figure 4A:
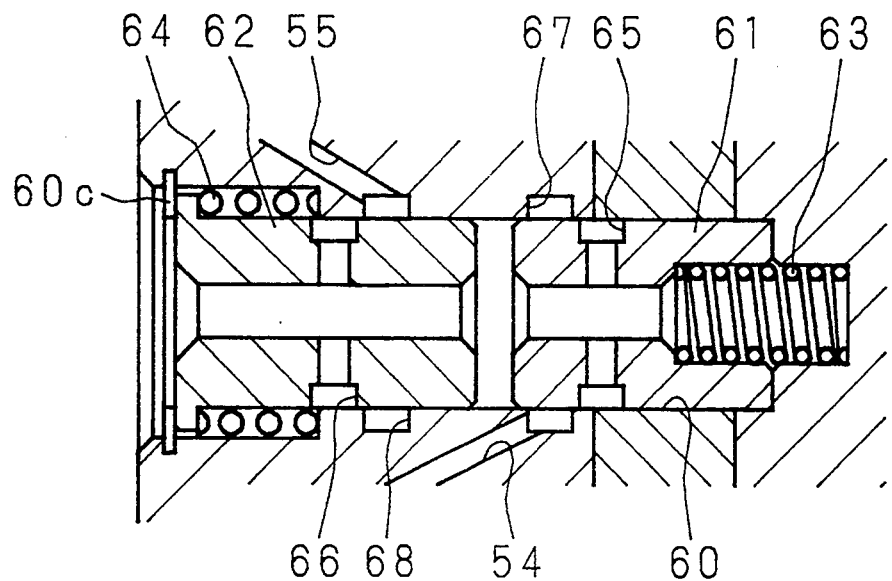
FIGS. 4(a) and 4(b) are explanatory views of the operations of the first and second spools of the first embodiment of a power transmission apparatus of the invention.

On the other hand, the throttle groove 68 being the opening end of the second communicating hole 55 is in the state of being almost closing the throttle groove 66, as shown in FIG. 3 and FIG. 4(a), in the case where the second spool 62 is pressed by the spring force of the coil spring 64 to be at the position where it is pressed against the snap ring 60c. On the other hand, in the case where the second spool 62 moves against the spring force of the coil spring 64 to be in contact with the end surface of the first spool 61, the throttle groove 68 is in the state of closing the throttle groove 66, as shown in FIG. 4.

Figure 4B:
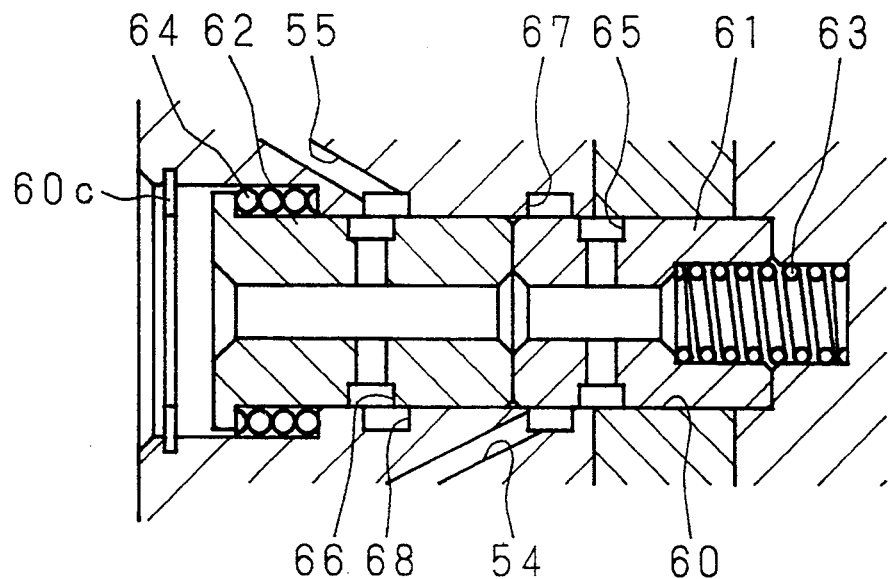

Accordingly, the oil-through resistance at the discharge side of the vane pump 3, as shown in FIG. 4(a), becomes maximum in the case where only the first spool 61 moves to cut off the communication between the throttle grooves 65 and 67, and that between the throttle grooves 66 and 68. As shown in FIG. 4(b) although assistance becomes minimum in the case where both of the spools 61 and 62 move together and the communicating state is obtained between the throttle groove 66, 68 over its full width. Further as shown in FIG. 3, in the case where the first and second spools 61, 62 do not move an intermediate oil-through resistance is obtained at the discharge side of the vane pump 3 because of communication between the throttle grooves 65 and 67 over its half length.

The whole or a part of the first and second spools 61, 62 are formed of magnetic material. The movements of the first and second spools 61 and 62 are caused by the operation of magnetic field produced by the driving coil 7 circumferentially arranged at the outside of the holding cylinder 50. The driving coil 7 is fixed at the center of the inside of the supporting cylinder 8 supporting the coupling member 5 coaxially and rotatably at the inside thereof and together with the supporting cylinder 8, the coil 7 is restricted at the part of a vehicle body in a non-rotational state through a coupling member 9 (refer to FIG. 2).

According to such a configuration, the driving coil 7 is circumferentially arranged in the vicinity of the outer peripheral surface of the holding cylinder 50 without changing the relative position thereof. On the other hand, because the holding cylinder 50 is of non-magnetic material, the magnetic field formed by current flowing to the driving coil 7 concentrates on the inside of the spool chamber 60 without leaking to the holding cylinder 50, so that the first and second spools 61, 62 inserted in the spool chamber 60 is added the force whose direction is against that of the coil springs 63, 64 energizing them respectively, causing a rightward movement in the figure.

Explanation will be given on the operation of the first embodiment of an apparatus of the invention configured as aforementioned.

In the case where a rotational speed difference is generated between the input shaft 1 and the output shaft 2, relative rotation corresponding to the above-mentioned rotational speed difference is produced between the rotor 30 and cam ring 31 of the vane pump 3. Thereby, working oil in the oil tank T is introduced into the respective pump chambers through a suction oil passage 40 opening at the upstream sides in the respective relative-rotational directions. The working oil introduced into the respective pump chambers is sealed between two vanes 30a, 30a adjacent to each other and is rotated together with the rotor 30 to be pressurized. Accordingly, the hydraulic pressure corresponding to a speed of relative rotation, that is, a hydraulic pressure corresponding to the rotational speed difference between the input shaft 1 and the output shaft 2 is generated in the respective pump chamber. Since the hydraulic pressure generated in the respective pump chambers so operate as to restrict relative rotation between the rotor 30 and cam ring 31, a driving force corresponding to a rotational speed difference of both of them is transmitted from the input shaft 1 to the output shaft 2, that is, from either of the front or rear wheel, to the other wheel thereby four-wheel drive state is realized.

The pressurized oil in the pump chamber is introduced to the bases of the vanes 30a, 30a through the discharge oil passage 41 opening at the downstream side in the relative rotational direction to operate so as to pressure the respective vanes 30a, 30a outward. After this, the working oil is introduced into the annular groove 37 at the outside surface of the pressure plate 32 through the oil guide hole 42, and flows into the throttle groove 67, 68 through the first and second communicating holes 54, 55. The working oil supplied into the throttle grooves 67, 68 flows into the throttle grooves 65, 66 through a communicating portion having a throttled area corresponding to the moving positions of the first and second spools 61, 62, and is introduced into the cavity of the pressure plate 2 to return to the oil tank T through the reflux hole 43. In addition the working oil which has returned to the oil tank T is taken in the respective pump chambers of the vane pump 3 again to be used in a cycle.

In the operation above-mentioned, the hydraulic pressure in the respective pump chambers is generated against the oil-through resistance when the aforesaid working oil is returned, mainly against the oil-through resistance at the discharge side. The rate of change of the generated hydraulic pressure corresponding to the change of rotational speed difference is increased accompanying the increase of the oil-through resistance. On the other hand, the oil-through resistance at the discharge side of the vane pump 3 varies according to the aforesaid movements of the first and second spools 61, 62 corresponding to current flowing to the driving coil 7. Therefore, a transmission characteristic from the input shaft 1 to the output shaft 2 is produced with generated hydraulic pressures at the respective pump chambers as a medium is changed by adjusting the current flowing to the driving coil 7.

The current flowing to the driving coil 7 is adjusted in two steps according to a current-flow instruction given from the control unit 10 on the basis of the detected results of vehicle traveling state such as presence or absence of steering, vehicle speed and so one, to produce two kinds of magnetic fields of different intensity in respective steps. And in the case where a weak magnetic field is formed according to current flow of the first step, the aforesaid movement is produced at only the first spool 61 energized by the coil spring 63 of small spring constant, and the movement of the second spool 62 energized by the coil spring 64 of large spring constant is produced only when a more intense magnetic field is formed by current flow of the second step.

Therefore, according to current flow instruction in two steps given from the control unit 10, the first and second spools 61, 62 respectively move to the positions shown in FIG. 4(a) and (b) thus, three different kinds of moving positions are realized together with the moving position at the time of cutoff time of current flow as shown in FIG. 3. And at the respective moving positions, both of the first and second spools 61, 62 are positively restricted by the contact of the respective end surfaces with either the inside end of the spool chamber 61 or the snap ring 60c. Therefore, there is only a slight possibility that the oil-through resistances at the respective discharge sides of the vane pump 3 are not realized stably, thereby three different kinds of transmission characteristics corresponding thereto respectively being obtained stably.

And at this time, at the control unit 10 controlling current flowing to the driving coil 7, only two kinds of rough switchings are demanded on the basis of the detected results of traveling states of a vehicle speed, and there is no need of performing a complicated control operation. Also, the driving coil 7 is not needed to be of high accuracy in which a magnetic field corresponding precisely to current flow is needed and it is possible to obtain three kinds of transmission characteristics.

Figure 5:
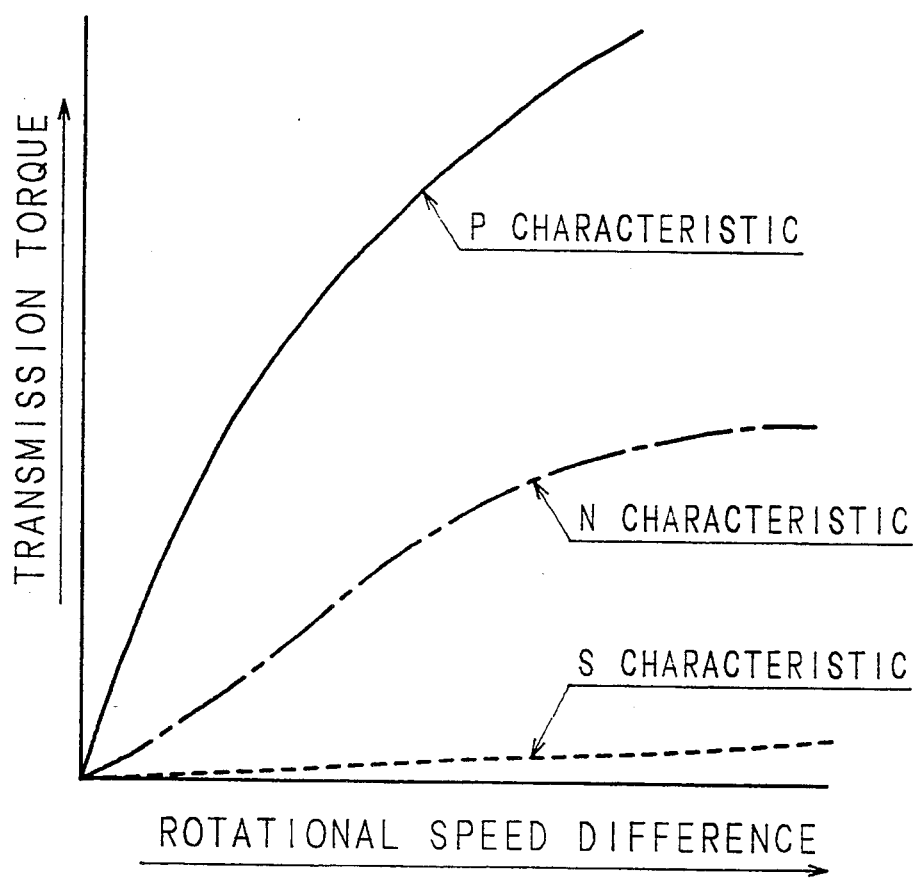
FIG. 5 is a graph showing an example of transmission characteristics realized by a power transmission apparatus of the invention.

FIG. 5 is a graph showing an example of transmission characteristics realized by an apparatus of the invention the abscissa showing a rotational speed difference between front and rear wheels and the ordinate showing transmission torque to the output shaft 2.

A solid line in FIG. 5 shows a characteristic (P characteristic) in the case where the first and second spools 61, 62 are in the state shown in FIG. 4(a) responsive to a small current flowing to the driving coil 7 and the oil-through resistance at the discharge side of the vane pump 3 is maximum. And a broken line shows a characteristic (S characteristic) in the case where the first and second spools 61, 62 are in the state shown in FIG. 4(b) responsive to large current flowing to the driving coil 7 and the oil-through resistance at the discharge side of the vane pump 3 is minimum. Further a dashed line shows a characteristic (N characteristic) in the case where the first and second spools 61, 62 are in the state shown in FIG. 3 and the oil-through resistance at the discharge side of the vane pump 3 is an intermediate one existing between the P characteristic and S characteristic.

In the case where the P characteristic, where the rate of increase of transmission torque characteristic to the increase of rotational speed difference is large, the input shaft 1 and the output shaft 2 are coupled rigidly, a relatively large driving force is transmitted to either of the input or output shaft responsive to a slight sliding generated at the other shaft, and a stabilized running on a slippy road such as snow-covered road and gravel road is possible. And in the case of the S characteristic where the rate of increase of transmission torque is small, a loose coupling state exists between the input shaft 1 arid the output shaft 2. In this condition, a rotational speed difference between both of the wheels is produced due to a difference between turning loci of front and rear wheels can be absorbed easily during turning at low speed, this being effective in preventing tight corner braking phenomena from being generated. Further, when the N characteristic, being the intermediate one between the P characteristic and S characteristic exists, the input shaft 1 and the output shaft 2 are almost direct-coupled. This enables the vehicle to escape from the state in which either of the front or rear wheels run idly due to rushing into snow or gravel, the so-called stack state.

In such a way in the present invention, by controlling current flowing to the driving coil 7 according to the control unit of a simple configuration, three different kinds of transmission characteristics are obtained, and a four-wheel drive state well-adapted to the vehicle's actual driving state is realized.

Figure 6:
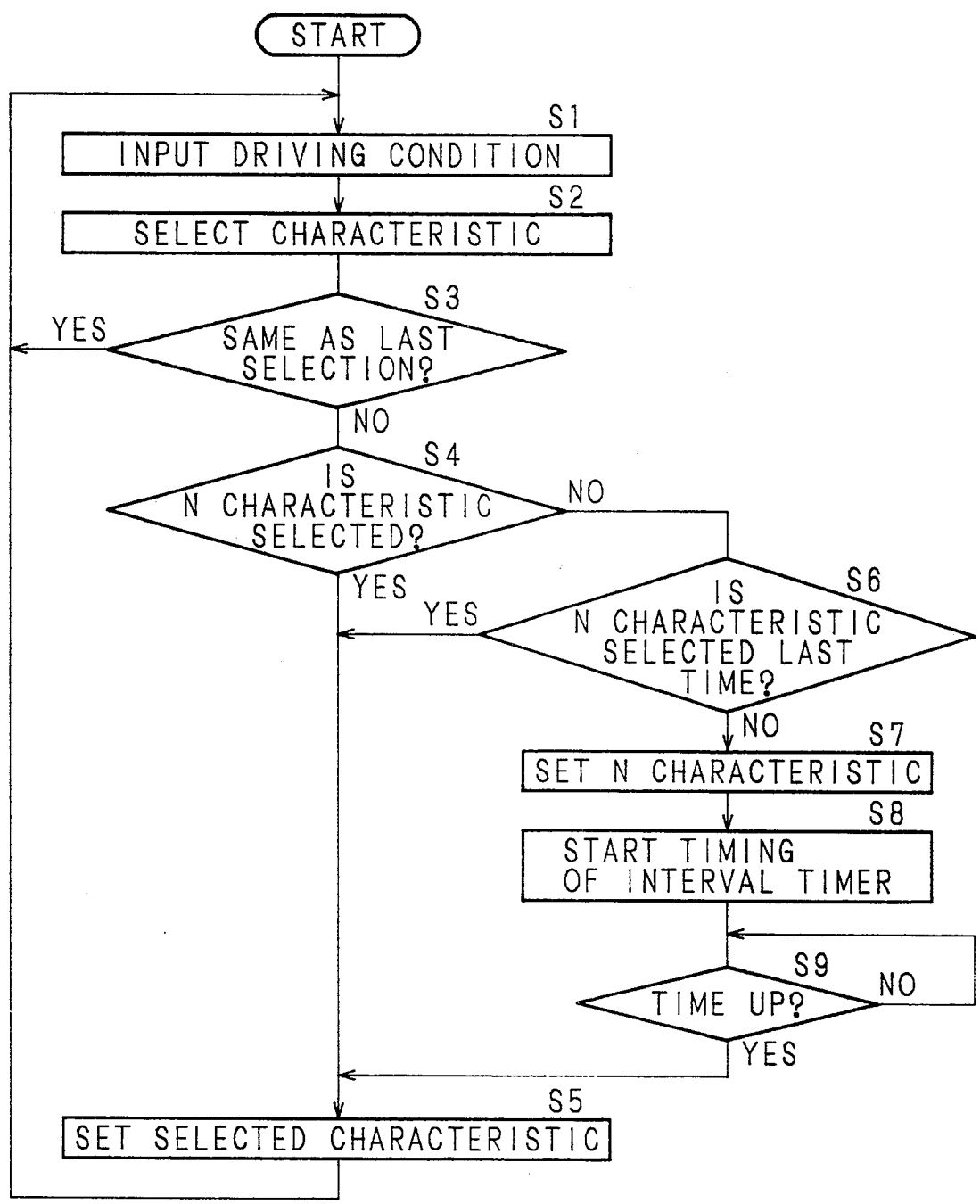
FIG. 6 is a flow chart showing operation contents of a control system of a power transmission apparatus of the invention.

FIG. 6 is a flow chart showing operation contents of the control unit 10.

As shown in the flow chart of FIG. 6, the control unit 10 receives detected results of various kinds of quantities related to driving states according to various kinds of sensors installed in the vehicle body at a predetermined sampling cycle (step S1), and selects one of the aforementioned three kinds of transmission characteristics (P characteristic, N characteristic and S characteristic) on the basis of the results (step S2).

As shown in FIG. 3, to the input side of the control unit 10, detected results of state quantities directly related to driving states are given from a vehicle speed sensor 11, a steering angle sensor 12, a brake sensor 13 and an acceleration opening sensor 14. At the same time control unit 10 also receives data from an open-air temperature sensor 15 detecting open-air temperature and a wiper switch 16 on-operating at the time of the wiper's operation. The control unit 10 is given detected results of state quantities directly related to driving states from the respective sensors 11, 12, 13, 14, 15 and the switch 16, and further, a power switch 17, on-operated by a driver manually, can forcedly select direct-coupling four-wheel drive state, that is, the P characteristic, is coupled with the unit 10.

The control unit to calculates the number of rotations of the engine (hereinafter referred to as engine speed) according to the detected results of the vehicle speed sensor 11 and acceleration opening sensor 14, and lateral G force applied to the vehicle body according to the detected results of the vehicle speed sensor 11 and steering angle sensor 12, respectively. These calculated values are compared with respective predetermined thresholds. Further the control unit 10 selects the aforesaid transmission characteristic according to a logic shown in, for example, Table 1, on the basis of the aforesaid comparing result, operating state of a brake recognized from the detected result of the brake sensor 13, and selecting result of tile transmission characteristic by a driver recognized from the on/off state of the power switch 17.

coupling of front and rear wheels. That is, the detected result of braking operation by the brake sensor 13 is used for judging whether the ABS apparatus is in the operating state or not. In the column of brake of Table 1, the ABS is ON at operation and OFF at non-operation. The PSW is defined as ON when the power switch 17 is turned on and OFF when it is turned off.

In the first through twelfth states, both the ABS and PSW are OFF.

The lateral G force is small in the first through fourth states, which means that these are in the straight running or turning state. In the respective states, occurrence of acceleration determined by the engine speed is the reference for selecting the mode. That is, when the engine speed is high, it is regarded as the accelerating state and the P mode is selected and when the engine speed is low, it is regarded as decelerating state and the N mode is selected. Thereby, the P mode close to the directly coupled four-wheel driving state is selected during acceleration to improve the accelerating performance. On the other hand, the medium N mode is selected during ordinary running at low speed and high speed, thereby stable running is realized and switching over to the braking state is carried out smoothly, to be described later.

TABLE 1

| STATE NO | LATERAL G | VEHICLE SPEED | ENGINE SPEED | BRAKE | POWER SWITCH | SELECTED CHARACTERISTIC |
|---|---|---|---|---|---|---|
| 1 | L | L | L | OfF | OFF | N |
| 2 | L | H | L | OFF | OFF | N |
| 3 | L | L | H | OFF | OFF | P |
| 4 | L | H | H | OFF | OFF | P |
| 5 | M | L | L | OFF | OFF | N |
| 6 | M | H | L | OFF | OFF | P |
| 7 | M | L | H | OFF | OFF | P |
| 8 | M | H | H | OFF | OFF | P |
| 9 | H | L | L | OFF | OFF | N |
| 10 | H | H | L | OFF | OFF | N |
| 11 | H | L | H | OFF | OFF | P |
| 12 | H | H | H | OFF | OFF | N |
| 13 | — | — | — | OFF | OFF | S |
| 14 | — | — | — | ON | ON | S |
| 15 | — | — | — | ON | ON | P |

In Table 1, the first through fifteenth states are defined.

Also, in Table 1, respective state quantities are defined as follows. The vehicle speed is defined as "H" for the relatively high speed above 30 km/h, and "L" for the relatively low speed below 30 km/h. The engine speed is defined as "H" for the speed above 4500 rpm which is regarded as the accelerating state and "L" for the speed below 4500 rpm which not regarded as the accelerating state. The lateral force is defined as "L" below 0.1 which is regarded as the slow turning or substantially straight running, "M" for the range above 0.1 and below 0.4 which is regarded as the turning state on a low $\mu$ road (road with low friction factor) factor on the high $\mu$ road (road with high friction or), and "H" above 0.4 which is regarded as the turning state on a high $\mu$ road.

In addition, detection of braking operation by the brake sensor 13 is necessary only for a vehicle provided with an ABS (anti-skid brake) apparatus. As generally known, the ABS apparatus is the one which so brakes respectively braking forces acting on respective wheels accompanying the braking operation so as to adjust rotational speed difference between wheels and is capable of braking stably by solving the problem of locking wheel, these operations being prevented by the direct- The fifth through eighth states are the turning states wherein a medium lateral G force acts. In these states, only in the case where vehicle speed and engine speed are low the N mode is selected, and for the other cases the P mode is selected. That is, only in the case where a certain degree of lateral G force is detected irrespective of the low-engine speed at low speed, the N mode is selected for switching over to the braking state anticipated thereafter, and for the other cases the P mode close to the directly coupled four-wheel driving state is selected, thereby the turning performance as well as the accelerating performance are improved.

The ninth through twelfth states are the turning states where large lateral G force occurs, or the rapid turning state on these roads with large friction factor (high $\mu$ road). In these states the P mode is selected only in the case where it is regarded as the accelerating state at low speed where the vehicle speed is low and the engine speed is high, and for other cases the N mode is selected. This is for avoiding the tight corner braking phenomenon which occurs when the directly coupled four-wheel driving state is realized. Accordingly, at low speed running where there is little possibility of occurrence of the tight corner braking phenomenon, the P mode is selected taking into account of improving the accelerating performance.

The thirteenth through fifteenth states are the control in which priority is given to the ABS and PSW, which are carried out preferentially relative to the other detection results of the speed sensor 11, steering angle sensor 12 and accelerator opening sensor 14.

The thirteenth and fourteenth states are the state in which the operating states of the ABS is selected by the brake sensor 13, and in these states, irrespective of the aforesaid lateral G force, vehicle speed, and engine speed, or regardless of ON/OFF of the power switch 17, the S mode is selected. Thereby since a loose coupling state is given preferentially between the front and rear wheels, the operation of the ABS is not hindered and a stable braking is realized.

The fifteenth state is the state wherein the ABS is not operating and the power switch 17 is turned on. In this state, irrespective of the lateral G force, vehicle speed and engine speed, the P mode is selected and driving characteristics close to the directly coupled four-wheel driving state is obtained. That is, the driving may turn on the power switch 17 when necessary to realize the directly coupled four-wheel driving state forcibly.

Also in this case, however, since priority is given to switch-over to the S mode in connection with the braking operation, there is no possibility of hindering the ABS operation during the rapid braking, so that stable braking is realized.

Input from the outside temperature sensor 15 and the wiper switch 16 to the control unit 10 are not used directly in selecting the mode as mentioned above, but in correcting the mode selected according to Table 1. That is, the control unit 10 is able to recognize that the wiper switch 16 is an, or the raining state from the input from the wiper switch 16, and moreover, recognize the snowing state by the detected temperature by the outside air temperature (e.g. below freezing). In the case where such recognition is made, since a slip due to wet roads and fallen snow is anticipated, the control unit 10 changes partly the N mode selected in the first, second, fifth, ninth, tenth and twelfth states to the P mode which is one step higher. Thereby deterioration of running stability in connection with vehicle slipping may be avoided effectively.

Such a selection of the transmission characteristic as aforementioned is performed every time of sampling of traveling state in Step S1 next, the control unit 10 compares the selected characteristic with that performed at the previous time of sampling (Step S3). In the case where both of the selected arid previous characteristics are the same and there is no need of changing the characteristic, the control unit 10 keeps the present state and returns to Step 1 to wait until the next sampling time to determine in tie state.

On the other hand, as a result of the comparing result in Step S3, in the case where the selected characteristic is different from that at the previous time and there is a need for changing the characteristic, the control unit 10 judges whether or not the selected characteristic this time is the N characteristic (Step S4). In the case where the N characteristic is selected, that is, there is a need for changing the P characteristic or S characteristic to the N characteristic the control unit 10 controls current flowing to the driving coil 7 so as to set the selected N characteristic (Step S5).

And as a result of judging in the Step S4, a characteristic other than the N characteristic the (P characteristic or S characteristic) is selected, the control unit 10 next judges whether or not the N characteristic is selected at the previous sampling time (Step S6). In the case where the N characteristic is selected, that is, there is a need for changing the N characteristic to the P characteristic or the S characteristic, the control unit 10 proceeds the processing to Step S5 intact, and controls current flowing to the driving coil 7 so as to set the characteristic selected this time the (P characteristic or S characteristic).

On the other hand, in the case when the judging result in Step S6 is "NO", that is, the characteristic selected at the previous time is the S characteristic or P characteristic, and there is a need to change the characteristic to the P characteristic or S characteristic, the control unit 10 temporarily sets the N characteristic regardless of the characteristic selected this time (Step S7), and start. an internal interval timer to measure. time at the same time (Step S8). The control unit 10 waits for the finish of measuring time performed for a predetermined time at the timer (Step S9), and proceeds the processing to Step S6 after that to set the characteristic selected this time the (P characteristic or S characteristic).

In addition, the control operation of the control unit 10 in Step S6 is one in which current flowing to the driving coil is cutoff in the case where the characteristic to be set is the N characteristic, and in the case where it is the P characteristic or S characteristic, the control unit 10 causes a small current or large current to flow to the driving coil 7, respectively. After such operations in Step S6, the control unit 10 returns the processing to Step 1 to sample the driving state at the next sampling time, and return a series of the aforesaid operations.

During such operations of the control unit 10 as aforementioned, the series of operations from Step S6 to Step S9 performed as aforementioned in changing from the P characteristic to S characteristic, or in changing reversely, are necessary because of the following reasons.

As aforementioned in the setting state of the P characteristic, the first and second spools 61, 62 are separated from each other as shown in FIG. 4(a) by the action of magnetic field generated in the spool chamber 60 caused by small current flowing to the driving coil 7. The changing from this state to the state in which the S characteristic is set is realized by increasing current flowing to the driving coil 7 and thereby increasing the magnetic field intensity of the inside of the spool chamber 60.

But at this time, due to such causes as that magnetic path gap at the inside of the spool chamber 60 is narrow and the total quantity of the line of magnetic force supplied to the second spool 62 is small, and the first spool 61 is not magnetically saturated in the state of setting the P characteristic and a part of line of magnetic force to be supplied to the second spool 62 according to magnetic field intensification for moving to the S characteristic is absorbed in the first spool 61, in actuality, increasing the magnetic field intensity generated by the driving coil 7, that is, a large-sized driving coil 7 is required in order to enable to change directly from the P characteristic to the S characteristic.

The operations from Step S6 to Step S9 are performed in order to solve the difficulties above-mentioned. That is, in the case where the changing from the P characteristic to the S characteristic is required, current flowing to the driving coil 7 is temporarily cut off, and as shown in FIG. 3, after the integration of the first and second spools 61, 62, a large current is made to flow to the driving coil 7. Thereby, line of magnetic force generated at the inside of the spool chamber 60 are supplied to the integrated first and second spools 61, 62 and both of the spools 61, 62 move integrally. Thereby, moving of the first and second spools 61, 62, that is, set-changing to the S characteristic is surely performed, and a small-sized driving coil 7 is possible.

A quite similar effect occurs in changing from the S characteristic to the P characteristic, and the aforesaid characteristic changing is surely performed without bringing about a large-sized driving coil 7 according to operations from Step S6 to Step S9. In addition, the setting time of the N characteristic in Step S7, that is, cut off time of current flowing to the driving coil 7 is extremely short, and the time counted by the interval timer controlling the setting time is enough when it is some tens ms or so, actually. Therefore, there is no possibility that a driver recognizes the change of transmission characteristic due to the counting time of the internal timer.

Figure 7A:
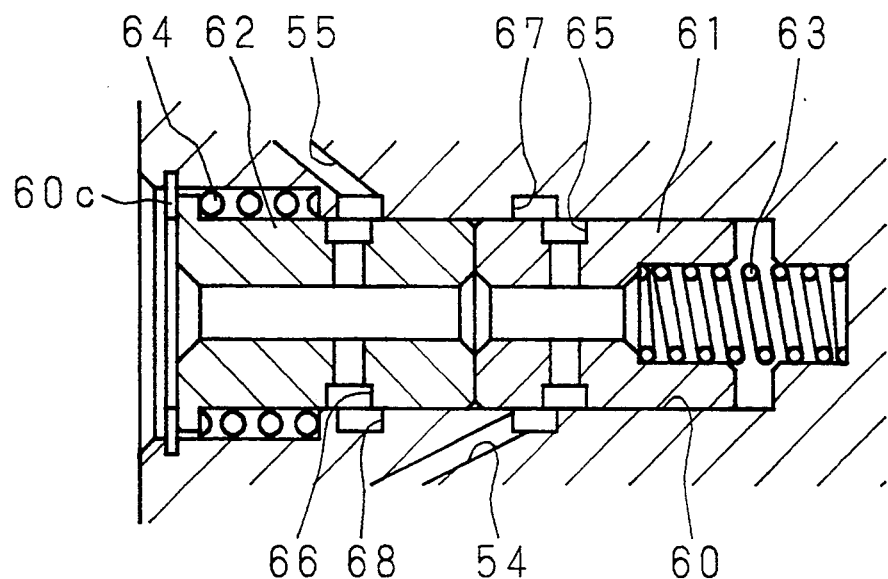
FIGS. 7(a) and 7(b) are enlarged sectional views of essential part showing another embodiment of the throttling portion in the first embodiment of a power transmission apparatus of the invention.
Figure 7B:
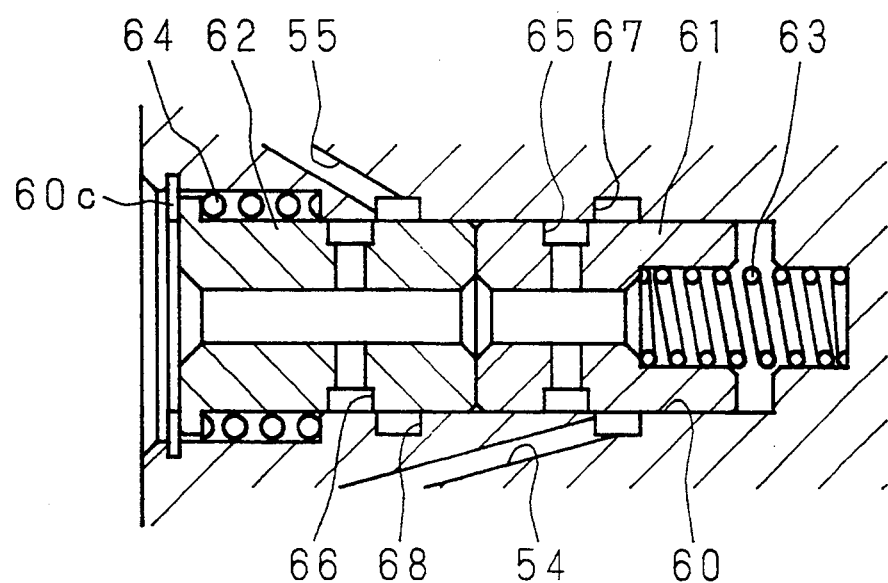

In addition, the above-mentioned embodiment is so configured that the N characteristic is realized by cutting off current flowing to the driving coil 7, the S characteristic b a large current, and the P characteristic by a small current, respectively. But as shown in FIG. 7, by changing the positions, at the inner periphery of the spool chamber 60, at which the throttle grooves 67, 68 are formed, the relation between current flowing to the driving coil 7 and the selected characteristic can be changed. That is to say, in the configuration shown in FIG. 7(a), the S characteristic is obtained at cutoff time of current, the N characteristic at flowing of small current and the P characteristic at flowing of large current, respectively, and in the configuration shown in FIG. 7(b), the P characteristic is obtained at cutoff time of current, the N characteristic at the flowing of small current and the S characteristic at the flowing of large current.

But in the case where the configuration of the latter, that is, the configuration shown in FIG. 7(b) is adopted, there is a need for changing contents of the flowchart shown in FIG. 6, and the characteristic to be judged in both Step S4 and Step S6 is the P characteristic, and the one set in Step S7 is also the P characteristic. That is to say the characteristic to be judged in Step S4 and Step S6, and the characteristic to be set in Step S7 are assumed to be the ones realized by cutoff of current flowing to the driving coil 7, any case that whatever relation there is between current flowing to the driving coil 7 and selected characteristic can be processed according to the flow chart shown in FIG. 6.

And the positions at which the driving coil 7 and the first and second spools 61, 62 are arranged are not limited to the ones shown in FIG. 2, but any positions will do if they are at the discharge side of the vane pump 3. However, the position of the driving coil 7 shown in the figure is optimum therefor, because it must be fixed since it is easy to make current flow thereto and the position at which the throttle member 6 moving by the action of generated magnetic field is also limited.

Figure 8:
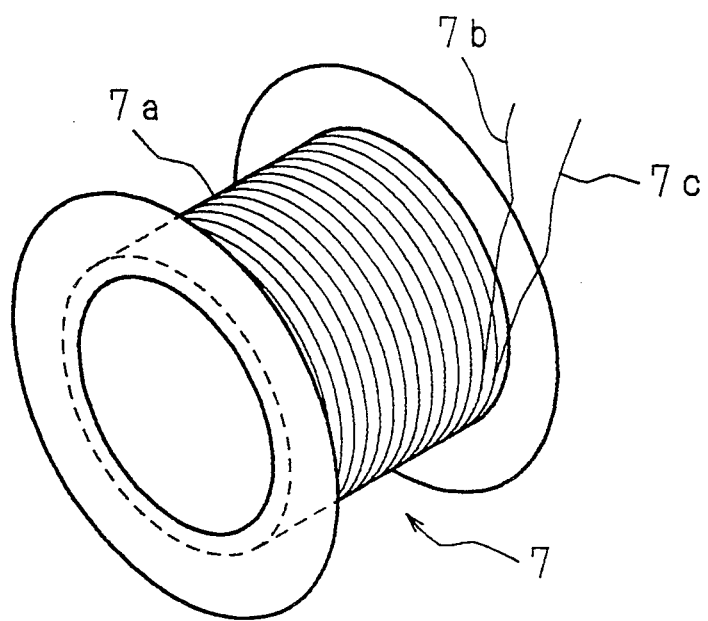
FIG. 8 is a perspective view showing another embodiment of a driving coil in a power transmission apparatus of the invention.

And the embodiment above-mentioned is so configured as to obtain three kinds of transmission characteristics according to changing current flowing to the driving coil 7 in one of two steps. However, such configuration as to obtain three kinds of transmission characteristics also can be accomplished, by arranging pair of driving coils in parallel along the shaft, thereby switching current flowing to both of them, current flowing to either of them, and current cutoff to both of them. Further, as shown in FIG. 8, such configuration as to obtain three kinds of transmission characteristics also can be accomplished, by using the driving coil 7 formed by being wound of two copper wires 7b, 7c in parallel at a core 7a, thereby switching current flowing to both of the copper wires 7b, 7c, current flowing to either of the copper wires 7b, 7c and current cutoff to both of the copper wires 7b, 7c. In addition, in the case where these configurations are adopted, all that the control unit 10 has to do is switch current flow and current cutoff, this enabling a further simplification of the configuration.

As aforedescribed, in the first embodiment of the apparatus of the invention, a simple configuration is adopted as that two kinds of intense and weak magnetic fields are formed in the spool chamber 60 according to current flowing to the driving coil 7, the first and second spools 61, 62 are moved respectively by the action of the magnetic fields and the opening ends of the two communicating holes 54, 55 respectively at the spool chamber 60 and at the discharge side of the vane pump 3 are closed or opened. It is possible to obtain a simple configuration to obtain the proper transmission characteristic corresponding to the driving state of a vehicle. And since both of the movements of the first and second spools 61, 62 by the action of the magnetic field are carried out to the respective predetermined position where they are positively restricted the transmission characteristics obtained respectively by the movements of the first and second spools 61, 62 to the respective predetermined positions are not changed accompanying the variation of the positions of the spools, thereby the proper transmission characteristic is realized stably.

Figure 9:
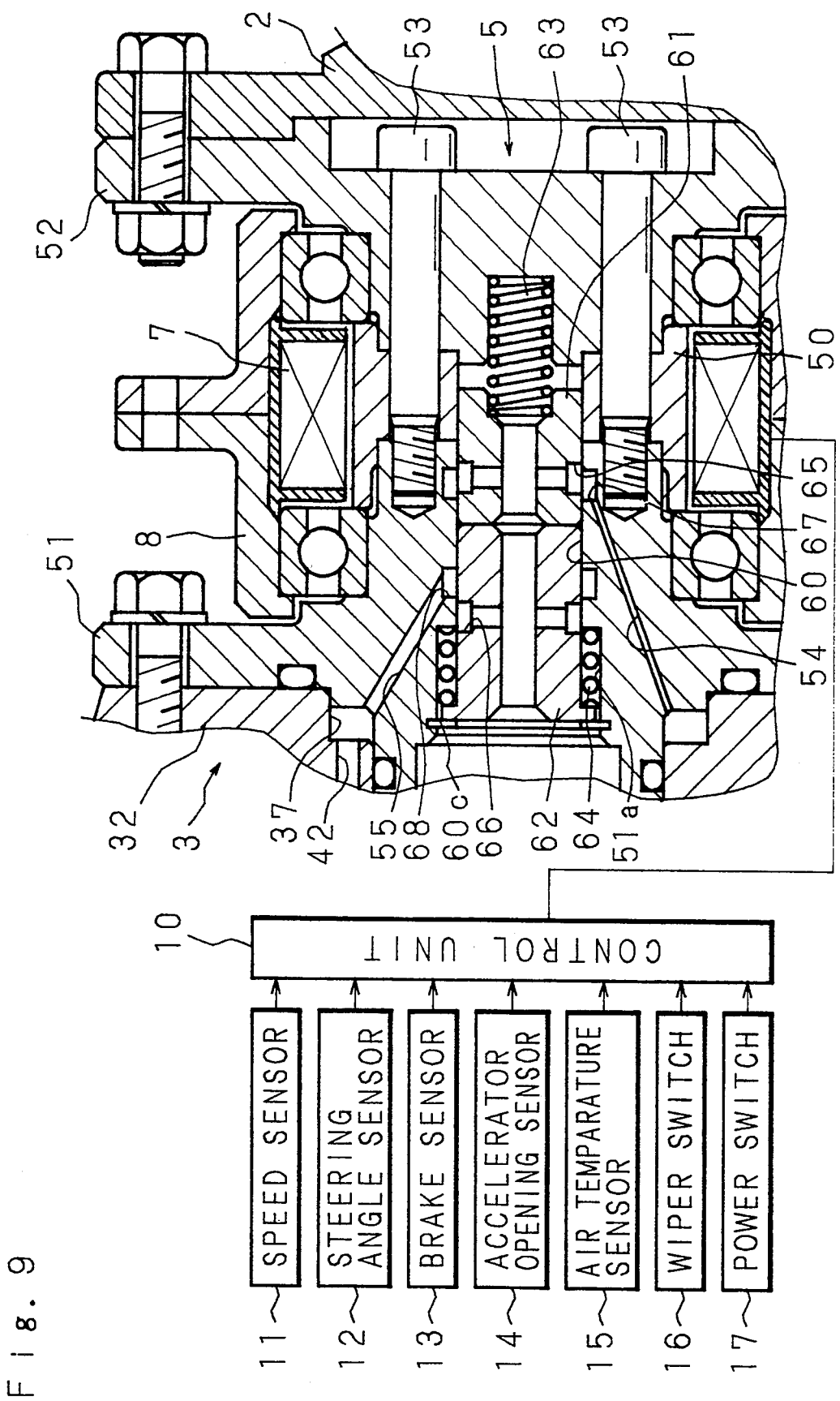
FIG. 9 is an enlarged sectional view showing a configuration of essential parts in the second embodiment of a power transmission apparatus of the invention.

FIG. 9 is an enlarged sectional view of a second embodiment of an apparatus of the present invention.

The second embodiment has sectional areas of the first and second communicating holes 54, 55 which are different from each other. In this embodiment, as shown in FIG. 9, the diameter of the first communicating hole 54 is made smaller than that of the second communicating hole 55. As a result, the oil-through resistance in the case where the opening end of the first communicating hole 43 is opened is larger that in the case where the opening end of the second communicating hole 55 is opened.

FIG. 10 is an explanatory view of operations of the first and second spools 61, 62 of the second embodiment of the invention.

The throttle groove 67 being an opening end of the first communicating hole 54 is in the state of being opened as shown in FIG. 9 in the case where the first spool 61 is pressed by the spring force of the coil spring 63 to be at the position where it is pressed against the end surface of the second spool 62. On the other hand, in the case where the first spool 61 moves against the spring force of the coil spring 6 to be contacted with the inside end of the spool chamber 60, the throttle groove 67 is in the state of almost completely being closed as shown in FIG. 10(a), (b).

On the contrary, the throttle groove 68 being an opening end of the second communicating hole 55 is in the state of almost completely being closed as shown in FIG. 9 and FIG. (10) a in the case where the second spool 62 is pressed by the spring force of the coil spring 64 to be at the position where it engages the snap ring 60c. On the other hand, the throttle groove 68 is in the state of being opened as shown in FIG. 10(b) in the case where the second spool 62 moves against the spring force of the coil spring 64 into contact with the end surface of the first spool 61.

Figure 10A:
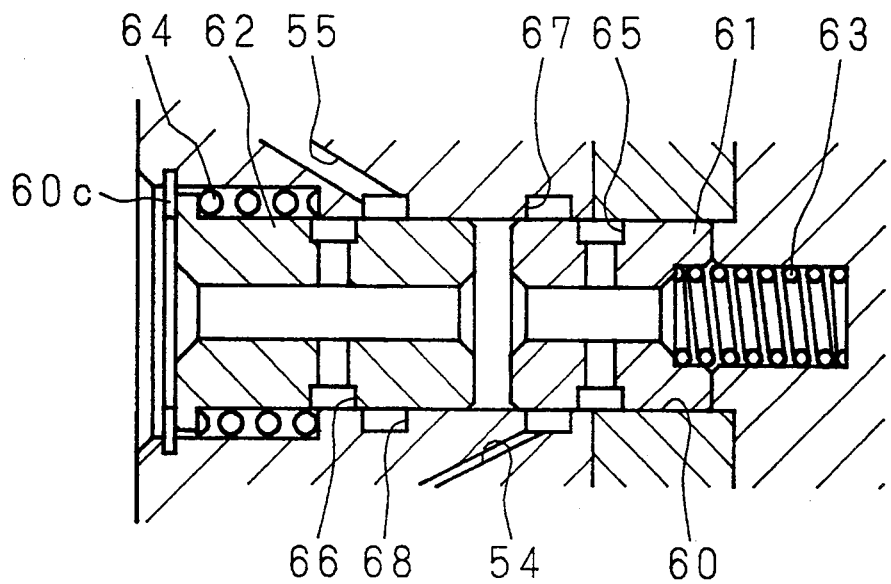
FIGS. 10(a) and 10(b) are explanatory views of operations of the first and second spools in the second embodiment of a power transmission apparatus of the invention.
Figure 10B:
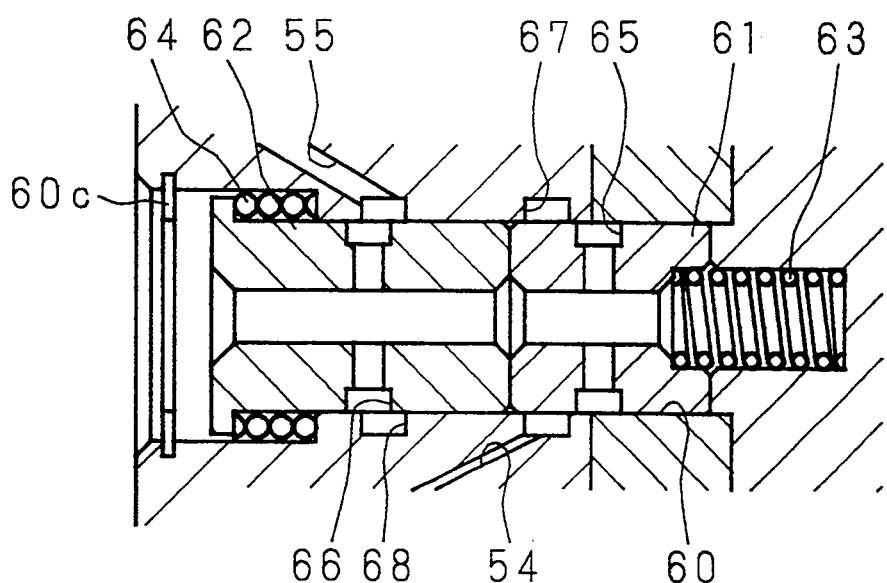

As aforedescribed, in the second embodiment of the invention, the area of the first communicating hole is made smaller than that of the second communicating hole 55, and the oil-through resistance at the discharge side of the vane pump 3, as shown in FIG. 10(a), becomes maximum in the case where only the first spool 61 moves to close the throttle grooves 67, 68 together, and as shown in FIG. 10(b), it becomes minimum in the case where both of the spools 61, 62 move together to open the opening end of the second communicating hole 55 having larger area. Further, as shown in FIG. 9, in the case where the first and second spools 61, 62 do not move together and the opening end of the first communicating hole 54 having smaller area is in the state of being opened, an intermediate oil-through resistance is obtained at the discharge side of the vane pump 3.

In the second embodiment of the present invention configurated as aforementioned, responsive to current-flow instruction in two steps given from the control unit 10, the states respectively shown in FIG. 10(a) and (b) are obtained, thereby, together with the state shown in FIG. 9 obtained by current cutoff, the aforesaid three kinds of oil-through resistances are obtained at the discharge side of the vane pump 3. In addition, both of the moving positions of the first and second spools 61, 62 in these respective states are positively restricted by being contacted at the respective end surfaces with the inside end of the spool chamber 60 or with the snap ring 60c. Therefore, there is almost no possibility that the positions of the first and second spools 61, 62 in these states may vary. And the oil-through resistance in the respective states does not depend upon the opening degrees of the first and second communicating holes 54, 55, but upon the sectional areas of both of the communicating holes 54 55 themselves. Accordingly, the oil-through resistances an the discharge side of the vane pump 3 in the aforesaid respective states are surely realized, and three kinds of transmission characteristics corresponding thereto respectively are obtained stably.

Figure 11A:
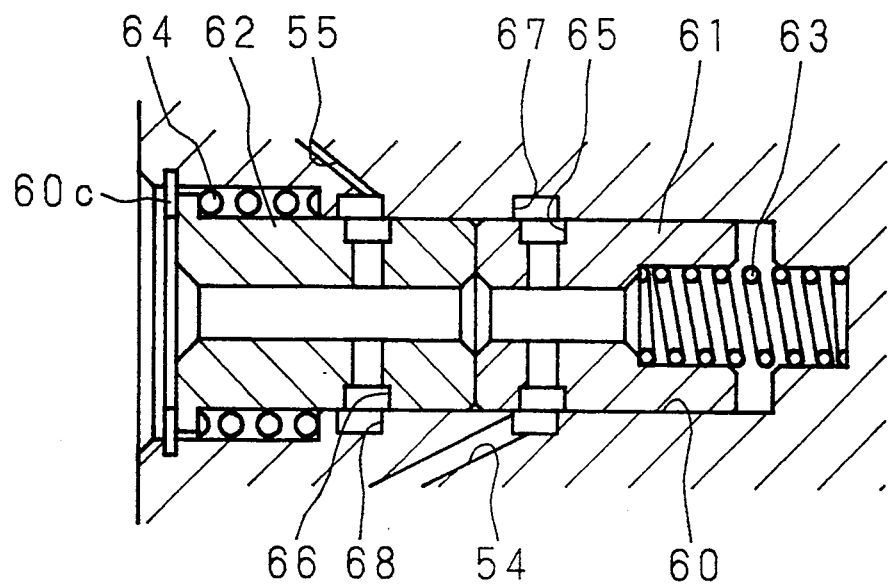
FIGS. 11(a) and 11(b) are enlarged sectional views of essential part showing another embodiment of the second embodiment of a power transmission apparatus of the invention.

In addition in the aforementioned embodiment the N characteristic is realized by cutting off current flowing to the driving coil 7, the S characteristic by large current and the P characteristic by small current, in the same way as in the aforesaid first embodiment. But, as shown in FIG. 11, by changing the opening position of the first and second communicating holes 54, 55 in the spool chamber 60 the relation between current flowing to the driving coil 7 and selected characteristic can be changed. Both of FIG. 11(a) and (b) show the states during cutoff time of current. In the configuration shown in FIG. 11(a), the S characteristic is obtained when the opening ends of the first and second communicating holes 54, 55 are opened together during cutoff time of current, the N characteristic is obtained when only the opening end of the first communicating hole 54 is closed during flowing of small current and the P characteristic is obtained when the first arid second communicating holes 54, 55 are closed together during flowing time of large current respectively. In this case, since the N characteristic depends upon the sectional area of the second communicating hole 55, a desired N characteristic is realized by making the area of the second communicating hole 55 small and by work-adjusting the communicating hole 55.

Figure 11B:
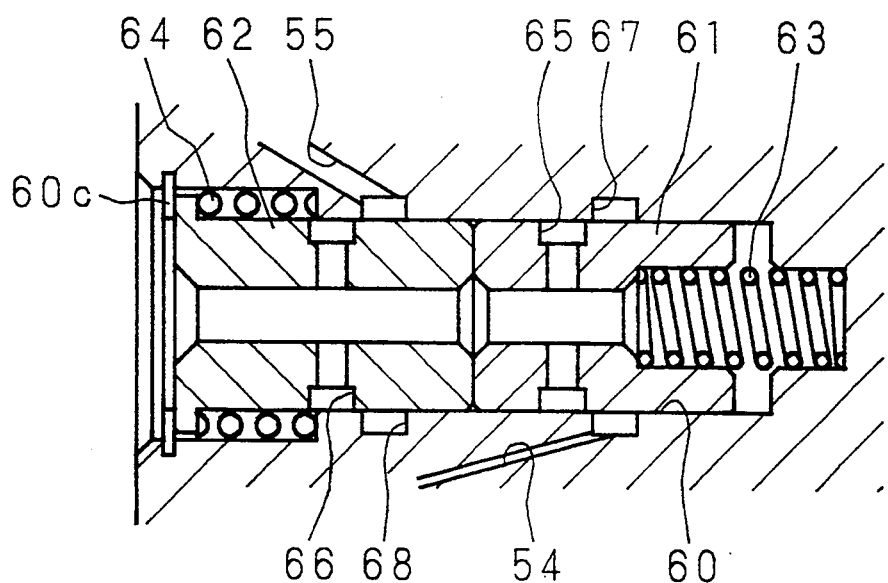

On the other hand, in the configuration shown in FIG. 11(b), the P characteristic is obtained when the opening ends of the first and second communicating holes 54, 55 are closed together during cutoff time of current, the N characteristic is obtained when the opening end of the first communicating hole 54 is opened during flowing of small current, and the S characteristic is obtained when the first and second communicating holes 54, 55 are opened together during flowing of large current.

In this way, the first and second spools 61, 62 are so arranged as to open or close the opening ends of the first and second communicating holes 54, 55 at the time of moving by the magnetic field action at the inside of the spool chamber 60, however, the arrangements thereof shown in FIG. 9 and FIG. 10 are desirable, for it is reasonable to realize the N characteristic being most frequently used by cutting off current flowing to the driving coil 7.

As aforedescribed, the second embodiment has a configuration such that two kinds of magnetic fields intense and weak ones are formed in the spool chamber 60 according to current flowing to the driving coil 7, the first and second spools 61, 62 are moved respectively according to these operations, thereby the opening ends of a pair of communicating holes 54, 55 whose sectional areas being different from each other, respectively at the spool chamber 60 and at the discharge side of the vane pump 3 are closed or opened. According to such a simple configuration, three kinds of transmission characteristics corresponding to driving state of a vehicle is realized. At that time, both the first and second spools 61, 62 move to the respective predetermined position where they are surely restricted, and there is almost no possibility of positional variation of the spools 61, 62 at each position before and after their moving. And since it is enough for the opening ends of the communicating holes 54, 55 to be closed or opened to the full according to the movements of the first and second spools 61, 62, high accuracy is not required for positioning the first and second spools 61, 62, but the respective transition characteristics are still realized surely and stably.

Figure 12:
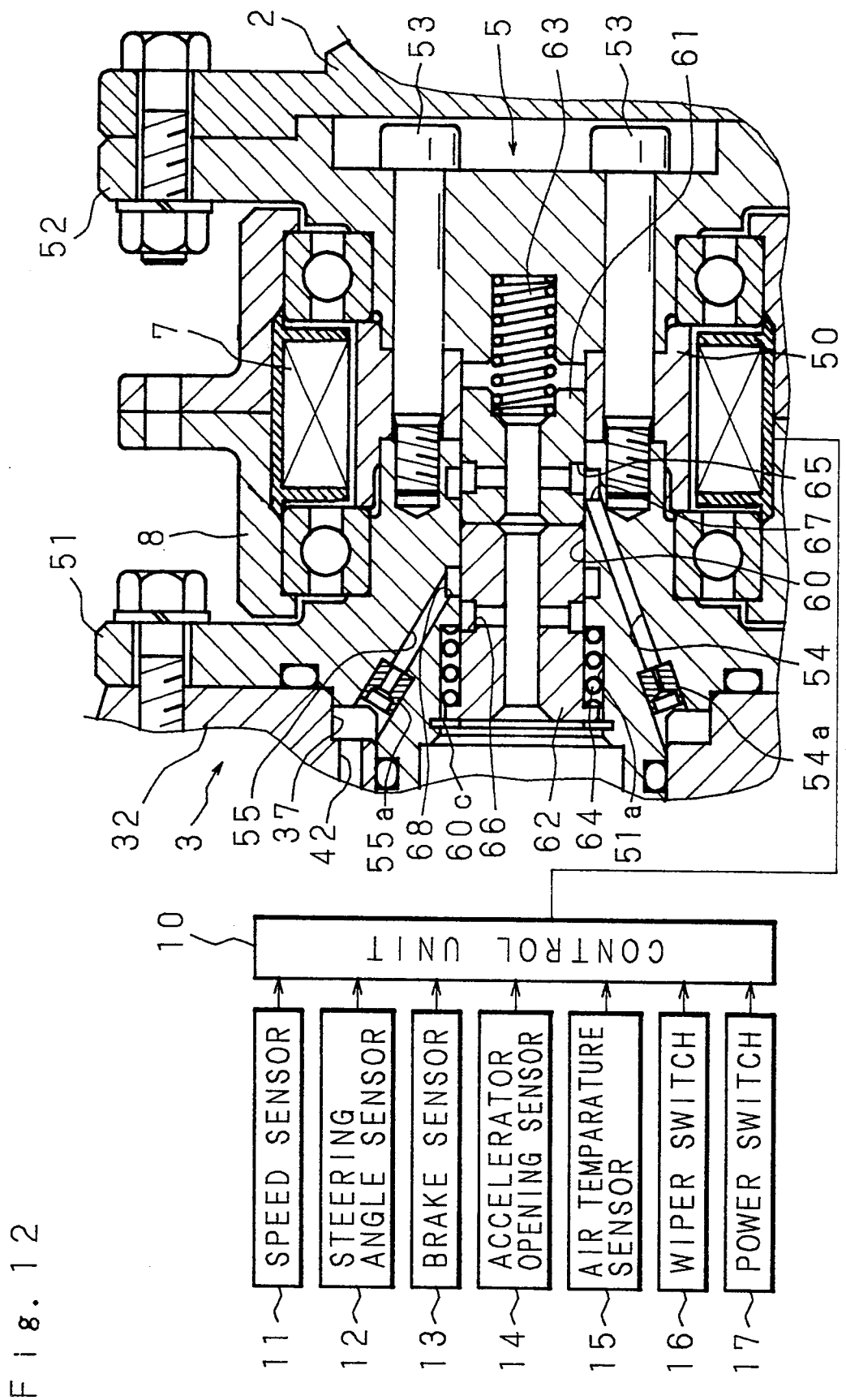
FIG. 12 is an enlarged sectional view showing a configuration of essential parts in the third embodiment of a power transmission apparatus of the invention.

FIG. 12 is an enlarged sectional view of the third embodiment of an apparatus of the present invention.

In the third embodiment, at the communicating ends of the first and second communicating holes 54, 55 to the annular groove 37 are formed, circular holes whose diameter are more enlarged than the other portions. In these circular holes, first and second throttle members 54a, 55a of short cylinder shape are respectively fixedly inserted. At the first and second throttle members 54a, 55a, throttle holes respectively having appropriate throttled areas at the respective shaft center portions are formed, there being respectively interposed between the annular groove 37 and the first and second communicating holes 54, 55. In addition, in the third embodiment of the intention as shown in FIG. 12, the throttled area at the first throttle member 54a fixed at the first communicating hole 54 is made relatively small and the throttled area of the second throttle member 55a fixed at the second communicating hole 55 relatively large. The relation of the sizes of these throttle areas can be reversed as described later.

The moving range of the first spool 61 inside of the spool chamber 60 includes the opening end of the first communicating hole 54, that is, the position at which the throttle groove 67 at the inside end of the periphery of the coupling flange 51, and that of the second spool 62 includes the opening end of the second communicating hole 55, that is, the position at which the throttle groove 68 is formed, these facts being the same as in the aforesaid first and second embodiments. And it is also same as in the aforesaid first and second embodiments that the opening end of the first communicating hole 54 is opened/closed by the movement of the first spool 61, and that of the second communicating hole 55 is by the movement of the second spool 62, respectively, that the oil-through resistances at the discharge side of the vane pump 3 vary according to the above-mentioned opening/closing.

But in the third embodiment, as aforesaid, the first throttle member 54a is fixed at the first communicating hole 54 and the second throttle member 55a is fixed at the second communicating hole 55, respectively. Therefore in the case where the first communicating hole 54 is opened according to the movement of the first spool 61, the first throttle member 54a fixed at the first communicating hole 54 is ill the state of being interposed at the discharge side of the vane pump 3. And in the case where the second communicating hole is opened according to the movement of the second spool 62, the second throttle member 55a fixed at the second communicating hole 55 is in the state of being interposed at the discharge side of the vane pump 3. And the oil-through resistances at the discharge side of the vane pump 3 in these respective cases are determined not by the opening degrees of the opening ends of the first and second communicating holes 54, 55 caused by the first and second spools 61, 62, but mainly by the throttled area of the first throttle member 54a or the second throttle member 55a fixed at the first and second communicating holes 54, 55 respective In addition, as aforementioned, in the third embodiment, since the diameter of the first throttle member 54a is smaller than that of the second throttle member 55a, the oil-through resistance in the case where the opening end of the first communicating hole 54 is opened according to the movement of the first spool 61 becomes larger than that in the case where the opening end of the second communicating hole 55 is opened according to the movement of the second spool 62.

FIG. 13 is an explanatory view of operations of the first and second spools 61, 62.

The throttle groove 67 being the opening end of the first communicating hole 54 is opened as shown in FIG. 12 in the case where the first spool 61 is pressed by the spring force of the coil spring 63 to be at the position where it engages the end surface of the second spool 62. On the other hand the throttle groove 67 is closed as shown in FIG. 13(a), (b) in the case where the first spool 61 moves against the spring force of the coil spring 63 to be at the position where it contacts the inside end of the spool chamber 60.

Figure 13A:
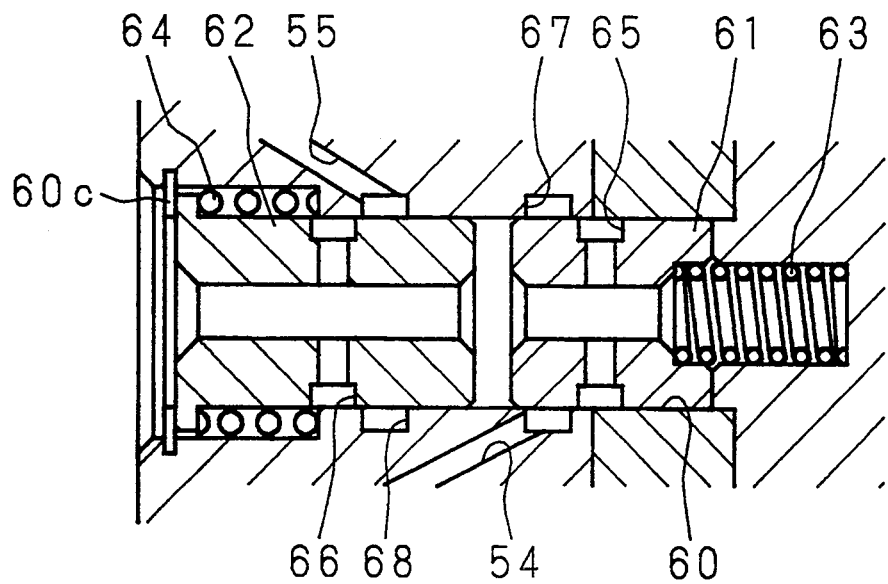
FIGS. 13(a) and 13(b) are explanatory views of operations of the first and second spools in the third embodiment of a power transmission apparatus of the invention.
Figure 13B:
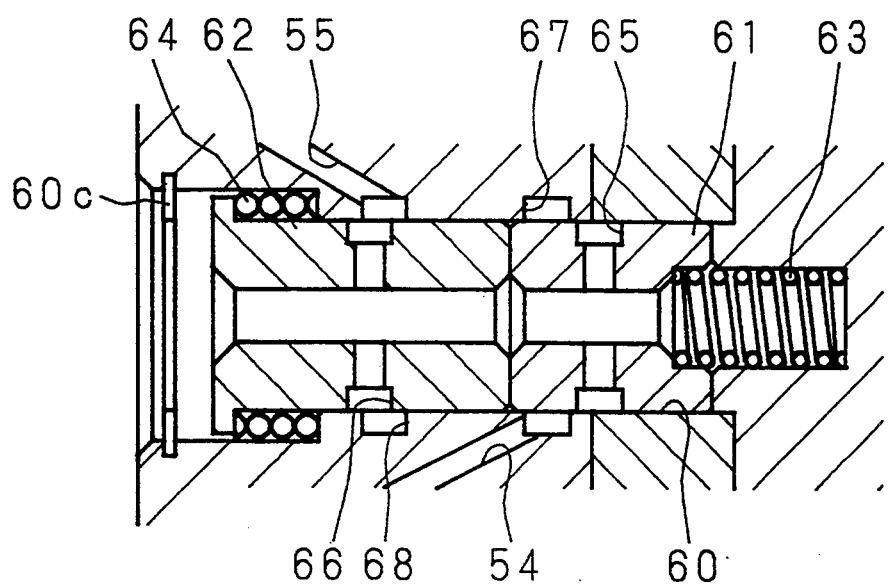

On the contrary, the throttle groove 68 being the opening end of the second communicating hole 55 is closed as shown in FIG. 12 and FIG. 13(a) in the case where the second spool 62 is at the position where it is pressed against the snap ring 60c by the spring force of the coil spring 64. On the other hand the throttle groove 68 is opened as shown in FIG. 13(b) in the case where the second spool 62 moves against the spring force of the coil spring 64 to be at the position where it contacts the end surface of the first spool 61.

As aforementioned, the throttled area of the first throttle member 54a fixed in the first communicating hole 54 is smaller than that of the second throttle member 55a fixed in the second communicating hole 55. Accordingly, the oil-through resistance at the discharge side of the vane pump 3 in the aforesaid respective states becomes maximum in the case where, as shown in FIG. 13(a), only the first spool 61 moves to close both the throttle groove 67 and throttle groove 68 together, becomes minimum in the case where, as shown in FIG. 13(b), both the spool 61 and 62 move together to open the opening end of the second communicating hole 55, and further becomes intermediate in the case where as shown in FIG. 12, both the first and second spools 61, 62 do not move and only the opening end of the first communicating hole 54 is opened.

The configurations of the first and second spools 61, 62 are both the same as in the aforesaid first and second embodiments.

The third embodiment is the same as the aforesaid first and second embodiments in that the states shown in FIG. 13(a) and (b) are respectively obtained according to the current flow instruction in two steps given from the control unit 10, and together with the state shown in FIG. 12 obtained from cutoff of current flow the aforesaid three kinds of oil-through resistances are realized.

In addition, the moving positions of the first and second spools 61, 62 in the respective states ale positively restricted since the respective end surfaces are contacted with the inside end of the spool chamber 60 or the snap ring 60c. Accordingly, there is almost no possibility that the positions of the first and second spools 61, 62 vary in these states. And the oil-through resistances in the respective states do not depend upon the opening degrees of the first and second communicating holes 54, 55 caused by both of the spools 61, 62 but depend upon the throttled areas of the first and second throttle members 54a, 55a respectively fixed in both of the communicating holes 54 55. Therefore, the oil-through resistances at the discharge side of the vane pump 3 in the respective state. are surely realized, thereby three kinds of transmission characteristics corresponding to these respective resistances being obtained stably.

And it is the same as in the aforesaid first and second embodiments that the control unit 10 giving an instruction of controlling current flowing to the driving coil 7 is only required to have a function to give two kinds of current flow instructions on the basis of the detected results of driving states, and does not need a complicated configuration. Further, it is also the same as in the aforesaid respective embodiments that high accuracy is not required for the magnetic field formed by current flowing to the driving coil 7 but only rough magnetic field in two steps, intense and weak are required.

Further, the transmission characteristics realized by the third embodiment of the apparatus of the present invention is same as that in the first embodiment shown in the graph of FIG. 5.

That is, the P characteristic is obtained in the case where the first and second spools 61, 62 are in the state shown in FIG. 13(a) according to small current flowing to the driving coil 7 and the oil-through resistance at the discharge sides of the vane pump 3 is maximum. The S characteristic is obtained in the case where the first and second spools 61, 62 are in the state of FIG. 13(b) according to large current flowing to the driving coil 7, and the oil-through resistance at the discharge side of the vane pump 3 is minimum according to the opening of the second communicating hole 55 provided with the second throttle member 55a having a large throttled area. Further, the N characteristic is obtained in the case where the first and second spools 61, 62 are in the state shown in FIG. 12 according to cutting off current flowing to the driving coil 7, and an intermediate oil-through resistance between the aforesaid two characteristics is obtained at the discharge side of the vane pump 3 according to the opening of the first communicating hole 04 provided with the first throttle member 54a having a large throttled area.

In addition, among these characteristics, since the N characteristic and S characteristic respectively depend upon the throttled areas of the first and second throttle members 54a, 55a respectively fixed in the first and second communicating holes 54, 55 when the throttled areas are adjusted on the basis of, for example, the result of characteristic tests performed after assembling the whole apparatus, it becomes possible to accurately obtain the desired S characteristic and N characteristic. The N characteristic is the one mainly utilized as described later, and in the apparatus of the invention, four-wheel drive state well-adapted to driving state can surely be realized according to realization of the desired N characteristic, thereby enabling comfortable driving in the respective driving states.

In addition, the aforesaid third embodiment is so configurated as that the N characteristic is realized according to cutoff of current flowing to the driving coil 7, the S characteristic according to a large current, and the P characteristic according to a small current, respectively. But as shown in FIG. 14, by charging the positions where the first and second communicating holes 54, 55 in the spool chamber 60, the relation between the state of current flowing to the driving coil 7 and the selected characteristic can be changed.

Figure 14A:
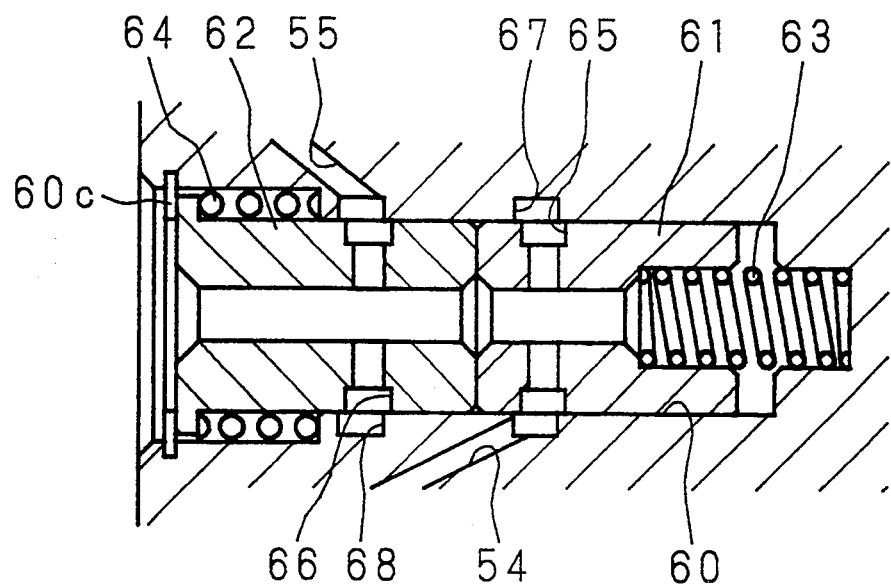
FIGS. 14(a) and 14(b) are enlarged sectional views of essential part showing a configuration of another embodiment of the third embodiment of a power transmission apparatus of the invention.

Both of FIG. 14(a), (b) show the states of time of current cutoff.

In the configuration shown in FIG. 14(a), the S characteristic is obtained when both of the opening ends of the first and second communicating holes 54, 55 are opened during the cutoff time of current, the N characteristic when only the opening end of the first communicating hole 54 is closed during flowing of a small current, and the P characteristic where both of the first and second communicating holes 54, 55 are closed during flow of a large current. In addition, in this case, since the N characteristic depends upon the oil-through resistance at the second communicating hole 55, the throttle area of the second throttle member 55a fixed in the second communicating hole 55 should be small.

Figure 14B:
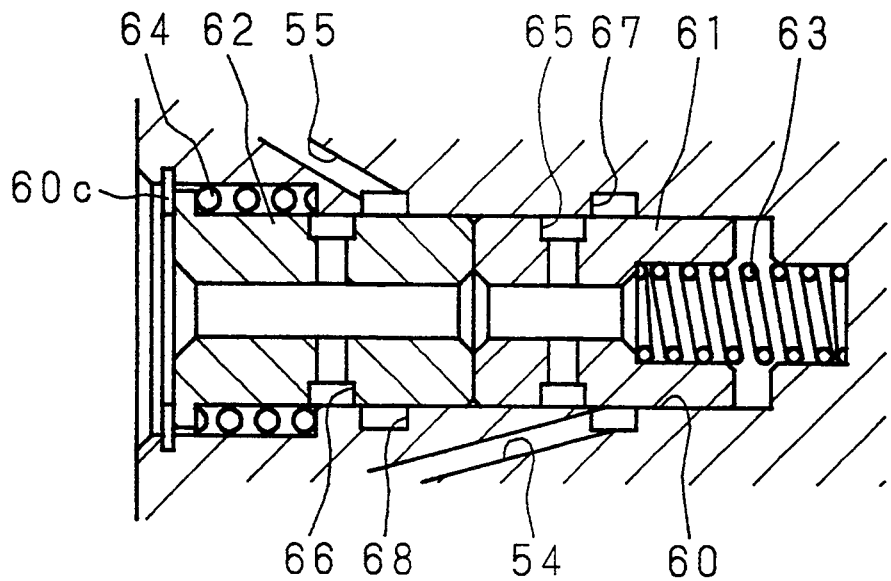

On the other hand, in the configuration shown in FIG. 14(b), the P characteristic is obtained when both of the opening ends of the first and second communicating holes 54, 55 are closed during the time of current cutoff, the N characteristic when the opening end of the first communicating hole 54 is opened during the time of a small current, and S characteristic when both of the first and second communicating holes 54, 55 are opened during the time of large current flow, respectively.

In such a way, any position will do where the first arid second spools 61, 62 are arranged if the spools 61, 62 can open or close the opening ends of the first and second communicating holes 54, 55 during the moving time of the spools 61, 62 by the magnetic field action in the spool chamber 60, however, it is rational to realize that the N characteristic is most frequently selected according to cutting off of current flowing to the driving coil 7, therefore the positions shown in FIG. 12 and FIG. 13 are desirable.

In addition, in the aforesaid third embodiment, explanation was given on the configuration that the throttle members 54a, 55a are fixed respectively in a pair of communicating holes 54, 55, however, such a configuration is also possible as that only when one throttle member 54a or 55a is fixed in one of corresponding communicating holes 54, 55 to realize the N characteristic at the opening time of the communicating holes 54, 55. And it is a matter of course that. the positions where the throttle members 54a, 55a are fixed should only satisfy the condition that they are in the middle of the communicating holes 54, 55 being not limited to the ones shown in FIG. 12.

As aforedescribed, the third embodiment of the apparatus of the invention has such a configuration as that two kinds of magnetic fields, intense and weak are formed in the spool chamber 60 according to current flowing to the driving coil 7, and the first and second spools 61, 62 are moved by the action of these magnetic fields to open or close the opening respectively at the spool chamber 60 and at the discharge side of the vane pump 3 ends of a pair of the communicating holes 54, 55. According to such a simple configuration, three kinds of transmission characteristics responsive to driving state of a vehicle can be realized. At this time, the first and second spools 61, 62 move to the respective predetermined positions where they are restricted, and there is almost no possibility that the spools 61, 62 vary at each position before and after moving. And since the throttle members are fixed in the communicating holes, the opening ends of the communicating holes, are only closed or opened to the full extent according to the movement of the spool 61, 62, thereby the respective transmission characteristics being able to be realized surely and stably without positioning both of the spools with high accuracy.

As this invention may be embodied in several forms without departing from the spirit of essential characteristics thereof, the present embodiment is therefore illustrative and not restrictive, since the scope of the invention is defined b the appended claims rather than by the description preceding them, and all changes that fall within the metes and bounds of the claims, or equivalence of such metes and bounds thereof are therefore intended to be embraced by the claims.

What is claimed is:

1. A power transmission apparatus for a vehicle which couples respective transmission shafts of front and rear wheels of a vehicle, comprising:

a hydraulic pump having a coaxial rotor and a casing which are interlockingly coupled respectively with said respective transmission shafts and relatively rotate and couple said rotor and casing by hydraulic pressure generated according to a rotational speed difference between said rotor and casing; and a variable throttle member for controlling the hydraulic coupling of between said rotor and casing including a spool chamber along the pump axis having first and second holes communicating respectively with the discharge side of said hydraulic pump respectively at different positions along the chamber;

a driving coil adjacent said spool chamber responsive to applied current for producing magnetic fields of first and second different intensities;

a first spool which moves in said spool chamber to a first predetermined position by the magnetic field of first intensity of said driving coil to close or open one of said communicating holes; and a second spool which moves in said spool chamber to a second predetermined position by the action of the magnetic field of second intensity of said driving coil.

2. A power transmission apparatus as set forth in claim 1, wherein the sectional areas of said first and second communicating holes are different from each other.

3. A power transmission apparatus as set forth in claim 2, further comprising a throttle member having a predetermined throttle area located one or both of said first and second communicating holes.

4. A power transmission apparatus as set forth in claim 3, wherein the throttle areas of said throttle members are different from each other.

5. A power transmission apparatus as set forth in claim 1, further comprising:

means, for detecting at least one of a plurality of quantifies related to driving states of the vehicle, and a unit which controls the current of said driving coil on the basis of the detected results of said detecting means.

6. A power transmission apparatus as set forth in claim 5, wherein said control unit controls the degree of opening of said variable throttle member in steps of current of said driving coil on the basis of a combination of the respective detected results of a plurality of quantifies detected by said detecting means.

7. A power transmission as set forth in claim 6, wherein said detecting means includes at least one of a vehicle speed sensor, steering angle sensor, brake sensor, and acceleration opening sensor.

8. A power transmission apparatus as set forth in claim 7, further comprising means for forcedly controlling said variable throttle member to open at a predetermined degree.

9. A power transmission apparatus as in claim 1, wherein with said first spool activated by said magnetic field of first intensity said throttle has one of the maximum and minimum resistance to hydraulic flow discharge effects and when said second spool is activated by said magnetic field of second intensity said throttle has the other of said maximum and minimum resistance to hydraulic flow discharge effects.

10. A power transmission as in claim 9 further comprising means for holding said first and second spools at positions in said spool chamber to provide an intermediate amount of hydraulic flow discharge resistance in the absence of a magnetic field produced by said driving coil.

11. A power transmission apparatus as in claim 1 further comprising means operating during the absence of a magnetic field produced by said driving coil for moving at least one of said first and second spools to a position different from its respective predetermined position produced by the respective magnetic fields of first and second intensity.

12. A power transmission apparatus as in claim 11 wherein said moving means comprises a spring.

13. A power transmission apparatus as in claim 5 wherein at any given time said control unit provides current for said drive coil to produce a magnetic field of only one said first or second intensities or provides no current for production of a magnetic field.

14. A power transmission apparatus as in claim 12, wherein with said first spool activated by said magnetic field of first intensity said throttle has one of the maximum and minimum resistance to hydraulic flow discharge effects and when said second spool is activated by said magnetic field of second intensity said throttle has the other of said maximum and minimum resistance to hydraulic flow discharge effects, and said throttle has an intermediate degree of resistance to hydraulic flow discharge in response to the absence of a magnetic field from said driving coil.

* * * * *